(12) United States Patent
Sako et al.

(10) Patent No.: US 9,665,167 B2
(45) Date of Patent: *May 30, 2017

(54) IMAGING DISPLAY APPARATUS AND METHOD

(71) Applicant: SONY CORPORATION, Tokyo (JP)

(72) Inventors: Yoichiro Sako, Tokyo (JP); Masaaki Tsuruta, Tokyo (JP); Taiji Ito, Kanagawa (JP); Masamichi Asukai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 14/093,225

(22) Filed: Nov. 29, 2013

(65) Prior Publication Data

US 2014/0092010 A1 Apr. 3, 2014

Related U.S. Application Data

(63) Continuation of application No. 13/926,531, filed on Jun. 25, 2013, now Pat. No. 8,624,798, which is a (Continued)

(30) Foreign Application Priority Data

Oct. 16, 2006 (JP) ................................ 2006-281043

(51) Int. Cl.
*G09G 5/00* (2006.01)
*G06F 3/00* (2006.01)
(Continued)

(52) U.S. Cl.
CPC ........... *G06F 3/005* (2013.01); *G02B 27/017* (2013.01); *G02B 27/0172* (2013.01); *H04N 13/044* (2013.01)

(58) Field of Classification Search
CPC ............................. G06F 3/005; G02B 27/017
(Continued)

(56) References Cited

U.S. PATENT DOCUMENTS 4,852,988 A 8/1989 Velez et al.
5,242,306 A 9/1993 Fisher
(Continued)

FOREIGN PATENT DOCUMENTS

EP 1 422 923 A2 5/2004
EP 1 862 840 A1 12/2007
(Continued)

OTHER PUBLICATIONS

Japanese Office Action issued Jul. 1, 2014, in Japan Patent Application No. 2006-281043.
(Continued)

*Primary Examiner* — Javid A Amini
(74) *Attorney, Agent, or Firm* — Oblon, McClelland, Maier & Neustadt, L.L.P.

(57) ABSTRACT

An imaging display apparatus, includes: display means for image display; first image signal generation means for generating a display image signal based on a captured image signal captured by an imaging section with a field of view direction of a user being a direction of an object; second image signal generation means for generating a display image signal of an image different from an image of the display image signal generated by the first image signal generation means; and control means for allowing, simultaneously on the display means, display of the image of the display image signal generated by the first image signal generation means and display of the image of the display image signal generated by the second image signal generation means.

20 Claims, 17 Drawing Sheets

Related U.S. Application Data continuation of application No. 13/564,439, filed on Aug. 1, 2012, now Pat. No. 8,514,149, which is a continuation of application No. 11/860,969, filed on Sep. 25, 2007.

(51) Int. Cl.
  *G02B 27/01* (2006.01)
  *H04N 13/04* (2006.01)

(58) Field of Classification Search
  USPC .......................................................... 345/156
  See application file for complete search history.

(56) References Cited

U.S. PATENT DOCUMENTS

| | | | |
|---|---|---|---|
| 5,311,225 | A | 5/1994 | Acier et al. |
| 5,487,665 | A | 1/1996 | Lechner et al. |
| 5,978,015 | A | 11/1999 | Ishibashi et al. |
| 6,020,931 | A | 2/2000 | Bilbrey et al. |
| 6,023,313 | A | 2/2000 | Hazama |
| 6,172,703 | B1 | 1/2001 | Lee |
| 6,421,031 | B1 | 7/2002 | Ronzani et al. |
| 6,433,760 | B1 | 8/2002 | Vaissie et al. |
| 6,518,939 | B1 | 2/2003 | Kikuchi |
| 6,606,114 | B1 | 8/2003 | Gordon et al. |
| 6,636,254 | B1 | 10/2003 | Onishi et al. |
| 6,909,419 | B2 | 6/2005 | Zavracky et al. |
| 6,931,661 | B2 | 8/2005 | Smith |
| 7,451,405 | B2 | 11/2008 | Sylthe et al. |
| 7,598,928 | B1 | 10/2009 | Buskop |
| 7,692,680 | B2 | 4/2010 | Graham et al. |
| 7,855,743 | B2 | 12/2010 | Sako et al. |
| 7,876,374 | B2 | 1/2011 | Sako et al. |
| 8,009,219 | B2 | 8/2011 | Sako et al. |
| 8,139,943 | B2 | 3/2012 | Asukai et al. |
| 8,218,820 | B2 | 7/2012 | Hayaski et al. |
| 8,253,760 | B2 | 8/2012 | Sako et al. |
| 8,294,776 | B2 | 10/2012 | Sako et al. |
| 8,514,149 | B2* | 8/2013 | Sako ............... H04N 13/044 345/32 |
| 2002/0163486 | A1* | 11/2002 | Ronzani ............... G02B 27/017 345/87 |
| 2004/0001149 | A1 | 1/2004 | Smith |
| 2004/0103111 | A1 | 5/2004 | Miller et al. |
| 2004/0223058 | A1 | 11/2004 | Richter et al. |
| 2005/0012826 | A1 | 1/2005 | Hattori et al. |
| 2005/0046615 | A1 | 3/2005 | Han |
| 2006/0050014 | A1 | 3/2006 | Yoon |
| 2007/0035619 | A1 | 2/2007 | Yoon |
| 2007/0050340 | A1 | 3/2007 | Von Kaenel et al. |
| 2008/0043203 | A1 | 2/2008 | Jacobs et al. |
| 2008/0062291 | A1 | 3/2008 | Sako et al. |
| 2008/0084486 | A1 | 4/2008 | Enge et al. |
| 2008/0107361 | A1 | 5/2008 | Asukai et al. |
| 2008/0129839 | A1 | 6/2008 | Asukai et al. |
| 2008/0130948 | A1 | 6/2008 | Ozer |
| 2008/0216171 | A1 | 9/2008 | Sano et al. |
| 2008/0239092 | A1 | 10/2008 | Sugino et al. |
| 2008/0244675 | A1 | 10/2008 | Sako et al. |
| 2008/0252758 | A1 | 10/2008 | Manley |
| 2008/0253695 | A1 | 10/2008 | Sano et al. |
| 2008/0273798 | A1 | 11/2008 | Asukai et al. |
| 2009/0115892 | A1 | 5/2009 | Sako et al. |
| 2009/0278766 | A1 | 11/2009 | Sako et al. |
| 2010/0013739 | A1 | 1/2010 | Sako et al. |
| 2010/0020185 | A1 | 1/2010 | Sako et al. |
| 2010/0063997 | A1 | 3/2010 | Sako et al. |
| 2010/0066840 | A1 | 3/2010 | Asukai et al. |
| 2010/0085462 | A1 | 4/2010 | Sako et al. |
| 2012/0147043 | A1 | 6/2012 | Asukai et al. |
| 2012/0293396 | A1* | 11/2012 | Sako .................... H04N 13/044 345/8 |

FOREIGN PATENT DOCUMENTS

| | | |
|---|---|---|
| JP | 5-258185 | 10/1993 |
| JP | 6-176131 | 6/1994 |
| JP | 8-6708 | 1/1996 |
| JP | 8-126031 | 5/1996 |
| JP | 9-27970 | 1/1997 |
| JP | 9-185009 | 7/1997 |
| JP | 2000-132306 | 5/2000 |
| JP | 2000-299851 | 10/2000 |
| JP | 2002-268621 | 9/2002 |
| JP | 2002-271691 | 9/2002 |
| JP | 2003-264740 | 9/2003 |
| JP | 2005-38321 | 2/2005 |
| JP | 2005-157762 | 6/2005 |
| JP | 2005-172851 | 6/2005 |
| JP | 2006-163383 | 6/2006 |
| JP | 2006-267604 | 10/2006 |
| JP | 2007-212577 | 8/2007 |
| WO | WO 2006/030613 A1 | 3/2006 |

OTHER PUBLICATIONS

U.S. Appl. No. 14/172,521, filed Feb. 4, 2014, Sako, et al.
Office Action issued Jan. 21, 2014 in Japanese Patent Application No. 2013-029778.
Office Action issued Nov. 12, 2013 in Japanese Patent Application No. 2013-3165.
Japanese Office Action in Japanese application 2006-281043 dated Nov. 7, 2013.
Office Action issued Nov. 20, 2012 in Japanese Patent Application No. 2006-281043.
Extended Search Report issued Nov. 30, 2012 in European Patent Application No. 07118570.6-1228.
Japanese Office Action issued Jul. 31, 2012, in Patent Application No. 2006-281043.
U.S. Appl. No. 14/612,722, filed Feb. 3, 2015, Sako, et al.

* cited by examiner

AR1  AR2

AR1  AR2

AR1  AR2

IMAGING DISPLAY APPARATUS AND METHOD

CROSS REFERENCES TO RELATED APPLICATIONS

This is a continuation of application Ser. No. 13/926,531, filed Jun. 25, 2013, allowed, which is a continuation of application Ser. No. 13/564,439, filed Aug. 1, 2012, now U.S. Pat. No. 8,514,149, which is a continuation of application Ser. No. 11/860,969, filed Sep. 25, 2007, now U.S. Pat. No. 8,253,760, and claims the benefit of priority under 35 U.S.C. §119 from Japanese Patent Application JP 2006-281043 filed in the Japanese Patent Office on Oct. 16, 2006, the entire contents of each are incorporated herein by reference.

BACKGROUND OF THE INVENTION

1. Field of the Invention

The present invention relates to an imaging display apparatus and method that can display images captured by an imaging section with a field of view direction of a user being a direction of an object.

2. Description of the Related Art

Various types of apparatuses have been proposed for image display with a display section, e.g., glass-type or head-wearing-type unit, disposed immediately before user's eyes. As examples, refer to JP-A-8-126031 (Patent Document 1), JP-A-9-27970 (Patent Document 2), and JP-A-9-185009 (Patent Document 3).

Also proposed is an apparatus that can capture images of the view in the field of view direction of a user with a small-sized camera attached to a glass-type or head-wearing-type unit. As an example, refer to JP-A-2005-172851 (Patent Document 4).

SUMMARY OF THE INVENTION

However, such previous devices are not yet providing a user with various types of images including the view in his or her field of view direction.

It is thus desirable to provide an imaging display apparatus and method that can provide a user with various types of images including the view in his or her field of view direction, enable to enhance the visual ability of the user, and offer the user with usability and enjoyment.

According to an embodiment of the present invention, there is provided an imaging display apparatus, including: display means for image display; first image signal generation means for generating a display image signal based on a captured image signal captured by an imaging section with a field of view direction of a user being a direction of an object; second image signal generation means for generating a display image signal of an image different from an image of the display image signal generated by the first image signal generation means; and control means for allowing, simultaneously on the display means, display of the image of the display image signal generated by the first image signal generation means and display of the image of the display image signal generated by the second image signal generation means.

The display means is disposed before eyes of a user for image display.

Alternatively, the display means is formed in a chassis different from a chassis including therein the first image signal generation means.

The first image signal generation means includes: the imaging section; and a signal processing section that performs signal processing with respect to the captured image signal captured by the imaging section.

The imaging section is configured to include, as an imaging element, a CCD (Charge Coupled Device) sensor or a CMOS (Complementary Metal Oxide Semiconductor) sensor.

The second image signal generation means generates the display image signal to be supplied to the display means based on the captured image signal captured by the imaging section.

In this case, the second image signal generation means includes: the imaging section; and a signal processing section that performs signal processing with respect to the captured image signal captured by the imaging section.

The imaging section captures an image of a view in the direction of an object being the field of view direction of a user.

Alternatively, the imaging section captures an image of a view in the direction of an object being not the field of view direction of a user.

The imaging section captures an image of a view in the direction of an object being variable.

The imaging section is configured to include, as an imaging element, a CCD sensor or a CMOS sensor.

The second image signal generation means generates the display image signal of the image different from the image of the display image signal generated by the first image signal generation means by operation control exercised by the imaging section over an imaging lens system.

The second image signal generation means generates the display image signal of the image different from the image of the display image signal generated by the first image signal generation means by the signal processing in the signal processing section.

The second image signal generation means includes a reception section that receives an image signal from an external device, and generates, based on the image signal received by the reception section, the display image signal of the image different from the image of the display image signal generated by the first image signal generation means.

The second image signal generation means includes a reproduction section that reproduces an image signal from a recording medium, and generates, based on the image signal reproduced by the reproduction section, the display image signal of the image different from the image of the display image signal generated by the first image signal generation means.

The display means is set with, in a screen area, a master screen area and a slave screen area, and in either the master screen area or the slave screen area, image display is made by the display image signal provided by the first image signal generation means, and on the remaining screen area, image display is made by the display image signal provided by the second image signal generation section.

In the display means, a screen area is split into two areas, and in one of the two areas, image display is made by the display image signal provided by the first image signal generation means, and in the remaining area, image display is made by the display image signal provided by the second image signal generation section.

One of the display image signals generated by the first and second image signal generation means is an image signal captured by close-range imaging or long-range imaging.

One of the display image signals generated by the first and second image signal generation means is an image signal captured by telephoto imaging or wide-angle imaging.

One of the display image signals generated by the first and second image signal generation means is an image signal captured by scale-up processing or scale-down processing.

One of the display image signals generated by the first and second image signal generation means is an image signal captured with an increase or a decrease of an imaging sensitivity.

One of the display image signals generated by the first and second image signal generation means is an image signal captured with an increase of an infrared imaging sensitivity.

One of the display image signals generated by the first and second image signal generation means is an image signal captured with an increase of an ultraviolet imaging sensitivity.

One of the display image signals generated by the first and second image signal generation means is an image signal captured in a field of view direction of a user being a direction of an object.

One of the display image signals generated by the first and second image signal generation means is an image signal captured in a direction, as the direction of the object, different from the field of view direction of the user.

According to another embodiment of the invention, there is provided an imaging display method, including: a first image signal generation step of generating a display image signal based on a captured image signal captured by an imaging section with a field of view direction of a user being a direction of an object; a second image signal generation step of generating a display image signal being an image different from an image of the display image signal generated in the first image signal generation step; and a display step of allowing, simultaneously, display of the image of the display image signal generated in the first image signal generation step and display of the image of the display image signal generated in the second image signal generation step.

According to the embodiments of the invention, as described above, when a user wears the imaging display apparatus of the embodiments of the invention being of a glass type or head-wearing type, for example, the imaging section becomes ready for capturing an image of a view in the field of view direction of the user. The resulting image captured by the imaging section as such, i.e., a display image signal being the image of the view in the field of view direction of the user derived by the first image signal generation means, is supplied to the display means for display thereon. At the same time of display as such, the display image signal generated by the second image signal generation means is also displayed, e.g., a plurality of images may be displayed all at once with screen split, picture-in-picture display, and others.

The image of the display image signal generated by the second image signal generation means is different from that of the display image signal generated by the first image signal generation means. The difference of these images may be variously resulted from the difference of imaging direction, or even with the same imaging direction, resulted from the difference of zooming, focal position, sensitivity, signal processing, and others, or the image of the second image signal generation means may be provided from any other apparatuses or reproduced from a recording medium, for example.

The display image signal of the first image signal generation means displays the image of the view normally spreading in front of the user, and the display image signal of the second image signal generation means displays any image that cannot be usually available with any normal sense of sight. As such, the user's visual ability can be enhanced, and interesting display can be offered.

Note here that the first and second image signal generation means each serve as a source of display image signals for display. The expressions of the first and second do not restrictively mean that two of the image signal generation means are provided, and this surely does not hinder the provision of three or more of the image signal generation means.

According to the embodiments of the invention, on the display means, the display image signal of the first image signal generation means displays the image of the view normally spreading in front of the user, and the display image signal of the second image signal generation means displays any image that cannot be usually available with any normal sense of sight so that the user's visual ability can be enhanced and usable or interesting display can be offered.

DETAILED DESCRIPTION OF THE INVENTION

In the below, described are an imaging display apparatus and method in an embodiment of the invention in the following order:

1. Exemplary External View of Imaging Display Apparatus and Relationship with External Device
2. Exemplary Configuration of Imaging Display Apparatus
   3. Area Configuration on Screen
   4. Exemplary Display Operation
   5. Exemplary Operation Trigger
   6. Effects of Embodiment, Modified Examples, and Enhanced Examples

Figure 1A:
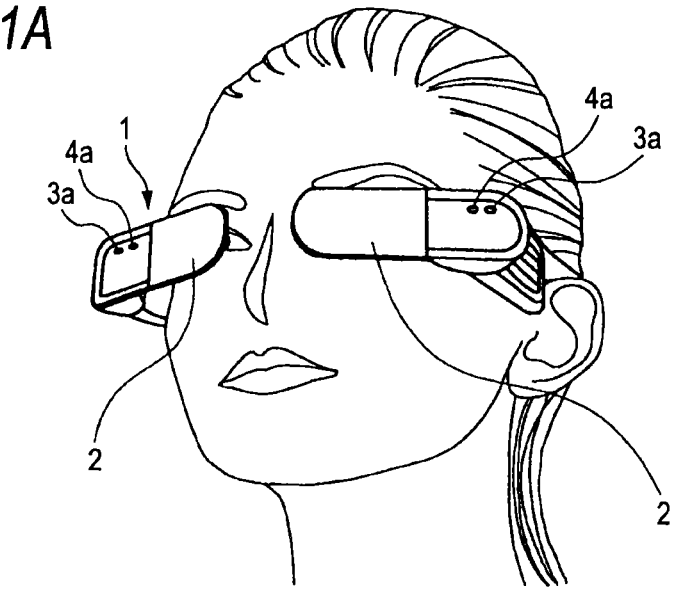
FIGS. 1A and 1B are each a diagram showing an exemplary external view of an imaging display apparatus of an embodiment of the invention.
Figure 1B:
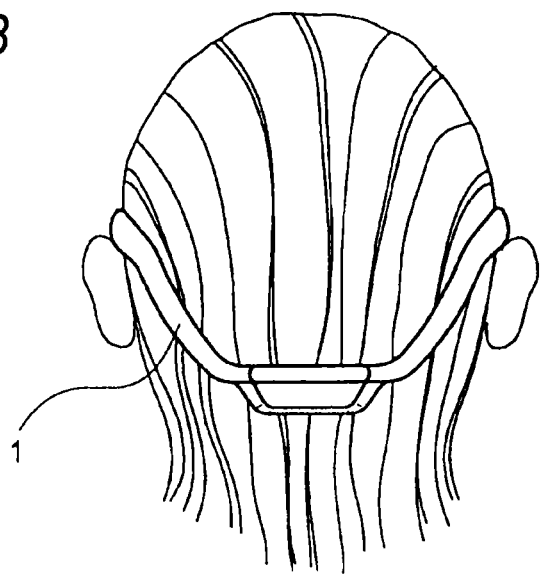

1. Exemplary External View of Imaging Display Apparatus and Relationship with External Device As an embodiment of the invention, FIGS. 1A and 1B each show an exemplary external view of an imaging display apparatus 1 being a glass-type display camera. The imaging display apparatus 1 exemplarily includes a wearable unit of a frame configuration as shown in FIG. 1B, i.e., extends halfway across the head from the sides to rear thereof. The wearable unit is placed on a user's ears as shown in FIG. 1A so that the user can wear the imaging display apparatus 1.

The imaging display apparatus 1 is so configured that a pair of display sections 2 and 2 is positioned immediately before the eyes of the user, i.e., where the lenses of a pair of normal glasses are positioned, when the user wears the apparatus. The display sections 2 are provided for the right and left eyes, respectively, and are each a liquid crystal panel, for example. Note here that when no image display is made by the display sections 2, the liquid crystal panels may be controlled in terms of transmittance, and may be put in the through state, i.e., made transparent or translucent.

The imaging display apparatus 1 is provided with two imaging lens 3a and 3a, which are disposed toward the front direction of the user when the user wears the apparatus 1, i.e., the two imaging lens 3a and 3a are both so attached that the field of view direction (frontward) of the user wearing the imaging display apparatus 1 is the direction of an object.

The imaging display apparatus 1 is provided with light-emitting sections 4a and 4a that illuminate the direction of imaging by the imaging lenses 3a and 3a. The light-emitting sections 4a and 4a are each formed by an LED (Light Emitting Diode), for example.

Although a detailed description will be given later by referring to FIG. 4, the imaging lenses 3a and 3a are respectively included in imaging function components (C1 and C2). The imaging lenses 3a and 3a each provide a captured image signal being the imaging result. The captured image signals are both subjected to any predetermined processing, and the resulting display image signals are displayed on the display sections 2.

The configuration of FIGS. 1A and 1B is merely an example, and various other configurations are possible for the imaging display apparatus 1 to make it available for the user to wear. The imaging display apparatus 1 may be formed with a wearable unit generally of a glass or head-wearing type, and in the embodiment, may be at least provided with the display sections 2 in the vicinity of the front of the user's eyes. The display sections 2 are not necessarily provided in pairs for each of the eyes, and alternatively, may be solely provided for one of the eyes.

In a possible configuration, the light-emitting sections 4a may not be provided.

In the configuration of FIGS. 1A and 1B, the imaging lenses 3a and 3a are so attached that the front of the user is the direction of an object. Alternatively, the two imaging lenses 3a and 3a may be so attached as to capture images of the view in each different direction as the direction of an object.

Figure 2A:
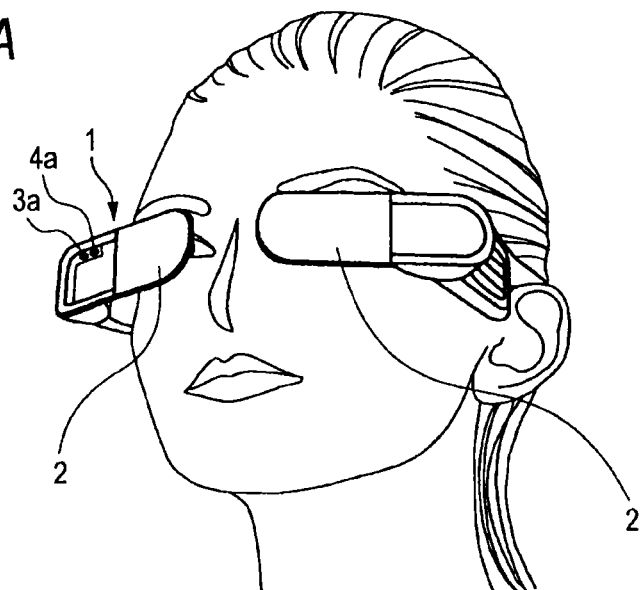
FIGS. 2A and 2B are each a diagram showing another exemplary external view of the imaging display apparatus of the embodiment.
Figure 2B:
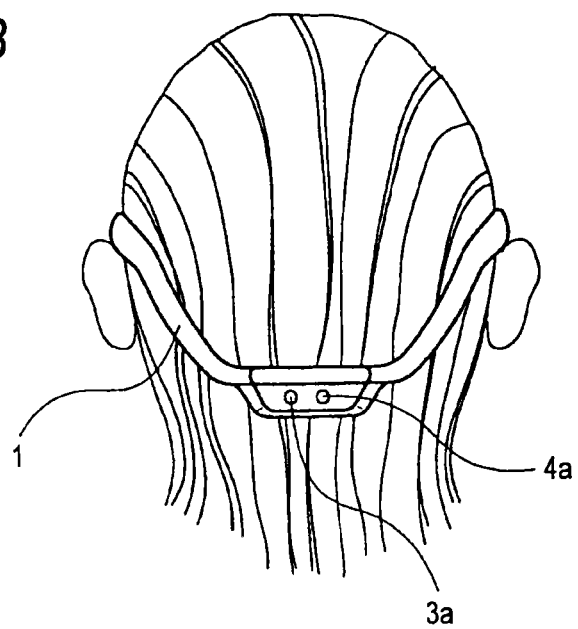

FIGS. 2A and 2B show an example. In the example of FIGS. 2A and 2B, for imaging in the front, one imaging lens 3a and one light-emitting section 4a are provided, and for the unit located on the rear side of the head, another imaging lens 3a and another light-emitting section 4a are provided. With such a configuration, one of these two imaging lenses 3a and 3a is in charge of imaging in the field of view direction of the user, and the remaining imaging lens 3a is in charge of imaging in the direction different from the field of view direction of the user, i.e., in this case, in the rear direction of the user.

In this embodiment, at least one imaging lens 3a is assumed as being in charge of imaging in the field of view direction of the user. When the remaining imaging lens 3a is so disposed as to take charge for imaging in the direction different from the field of view direction of the user, the direction of an object is not necessarily the rear direction of the user, and may be the upward, leftward, rightward, or downward direction, for example.

Alternatively, three or more of the imaging lens 3a may be provided, and these may be oriented in the same direction or in each different direction.

In the exemplary configurations of FIGS. 1A to 2B, the imaging lenses 3a and 3a are fixedly provided, and thus the direction of an object during imaging is fixed, i.e., in front and/or rear of the user. Alternatively, the imaging lens 3a may be provided via a movable mechanism that can change the direction of an object so that the direction of the object during imaging may be changed manually or automatically.

The imaging lenses 3a may be of various types, e.g., entirely a fixed type or a movable type, or partially a movable type.

Figure 3:
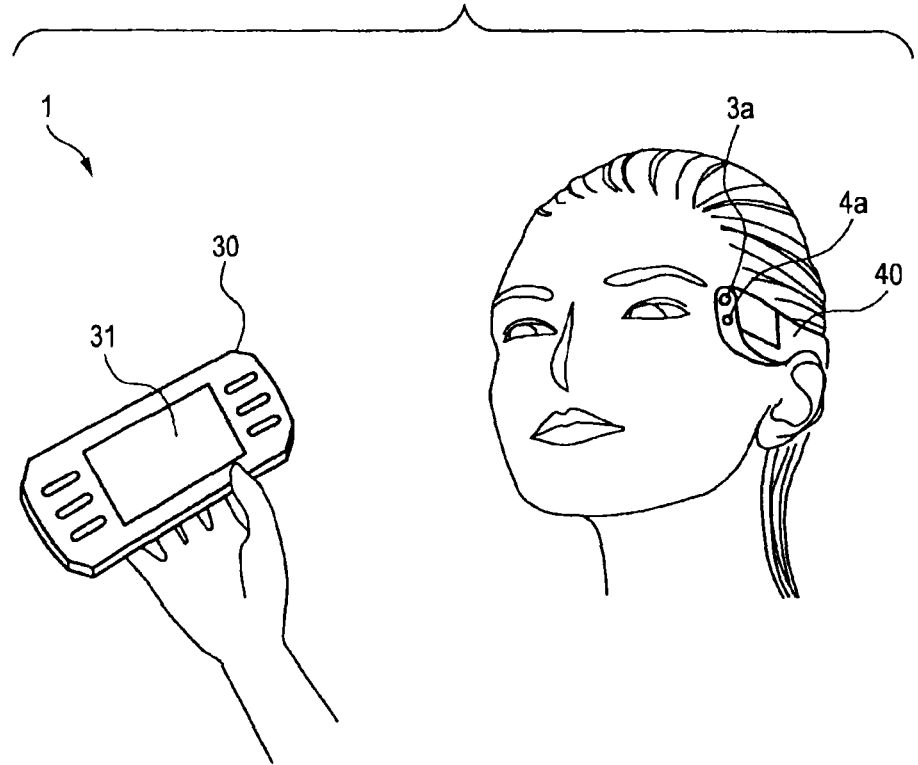
FIG. 3 is a diagram showing still another exemplary external view of the imaging display apparatus of the embodiment.

FIGS. 1A to 2B show the imaging display apparatuses 1 in which the portion for imaging is formed as a piece with the display sections 2 for monitoring of any captured images. FIG. 3 shows another possible configuration of the imaging display apparatus 1 in which the display section 2 is separately provided.

In the imaging display apparatus 1 of FIG. 3, an imaging unit section 40 and a display unit section 30 are separately provided.

The imaging unit section 40 is attached to the head portion of a user by any predetermined wearable unit. The imaging unit section 40 is provided with the imaging lens 3a, which is directed forward for imaging in the field of view direction of a user being the direction of an object when the user wears the imaging display apparatus 1.

The imaging unit section 40 is provided with the light-emitting section 4a that illuminates the direction of imaging by the imaging lens 3a. The light-emitting section 4a is formed by an LED, for example.

With such a configuration, although the details are left for later description, the imaging unit section 40 carries therein a communications section for forwarding data of any captured images to the display unit section 30, which is separately provided.

The display unit section 30 is assumed as being portable for a user with light weight and small size.

The display unit section 30 is provided therein with a communications section for data communications with the imaging unit section 40, and is operated to display image data, on a display screen 31, provided by the imaging unit section 40.

The user may use such an imaging display apparatus 1 in which the imaging unit section 40 and the display unit section 30 are provided separately from each other.

2. Exemplary Configuration of Imaging Display Apparatus

By referring to FIGS. 4 to 8, described below is an exemplary internal configuration of the imaging display apparatus 1.

Figure 4:
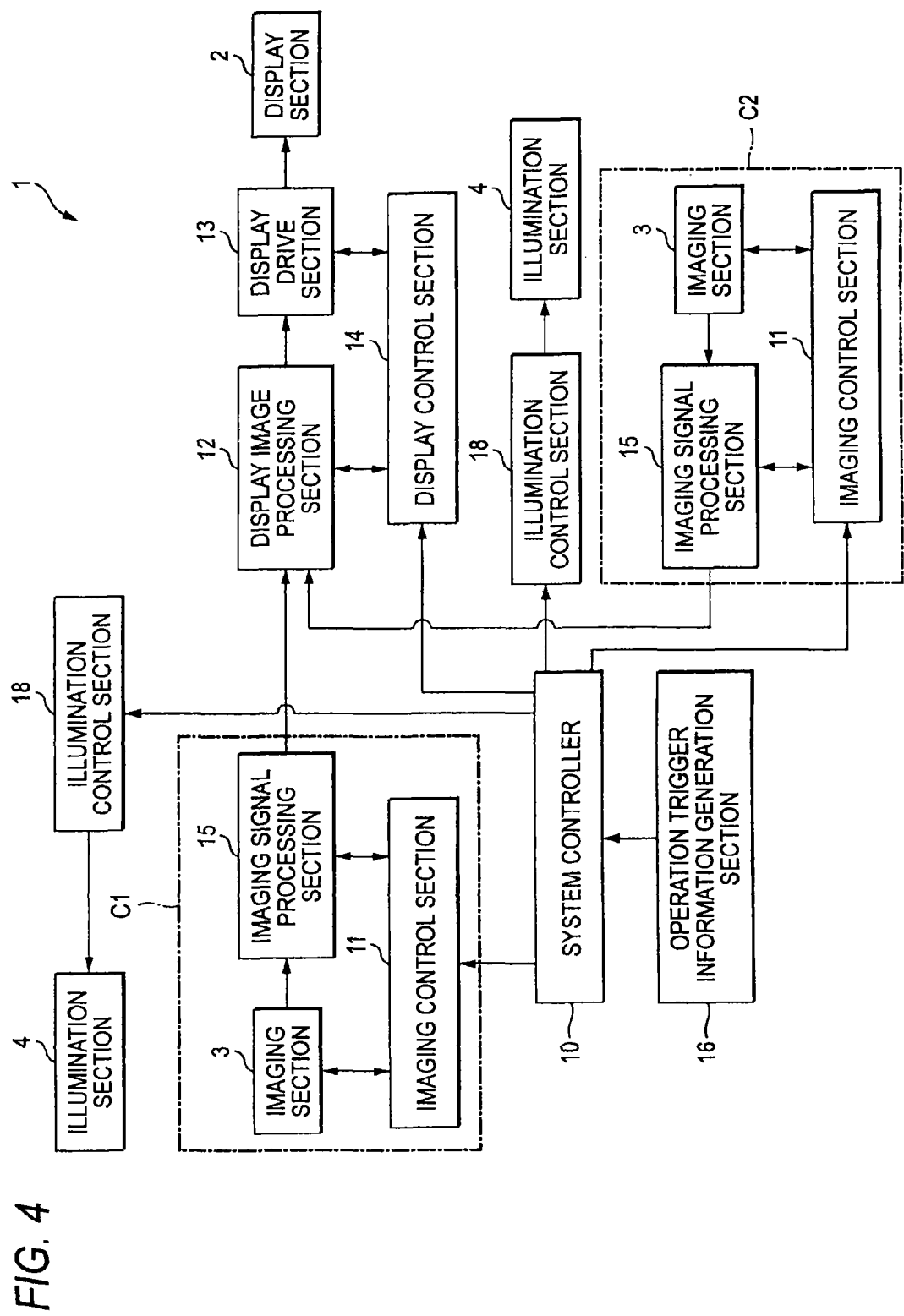
FIG. 4 is a block diagram showing the imaging display apparatus of the embodiment.

First of all, FIG. 4 shows an exemplary configuration corresponding to FIGS. 1A to 2B described above, i.e., two of the imaging function component are included.

A system controller 10 is configured by a microcomputer including a CPU (Central Processing Unit), ROM (Read Only Memory), RAM (Random Access Memory), a non-volatile memory section, and an interface section. The system controller 10 serves as a control section that exercises control over the imaging display apparatus 1 in its entirety.

This system controller 10 exercises control over the components in the imaging display apparatus 1 based on any internal operation program and an operation trigger coming from an operation trigger information generation section 16. The system controller 10 then makes the display section 2 perform any predetermined image display thereon.

In the imaging display apparatus 1, as a first imaging function component C1, provided are an imaging section 3, an imaging control section 11, and an imaging signal processing section 15.

The imaging section 3 in the imaging function component C1 is provided with the imaging lenses 3a of FIGS. 1A and 1B or FIGS. 2A and 2B, a lens system, a drive system, a solid-state imaging element array, and others. The lens system is configured to include an aperture, a zoom lens, a focus lens, and others. The drive system exercises control over the lens system to go through a focus operation and a zoom operation. The solid-state imaging element array detects an imaging light derived by the lens system, and generates an imaging signal through photoelectric conversion. The solid-state imaging element array is exemplified by a CCD (Charge Coupled Device) sensor array, and a CMOS (Complementary Metal Oxide Semiconductor) sensor array.

In FIGS. 1 and 2 examples, the imaging section 3 in the imaging function component C1 capture images of the view in front of a user.

The imaging signal processing section 15 is configured to include a sample hold/AGC (Automatic Gain Control) circuit or a video A/D (Analog-to-Digital) converter, and derives an imaging signal being digital data. The sample hold/AGC circuit performs gain adjustment and waveform shaping with respect to a signal derived by the solid-state imaging element in the imaging section 3. The imaging signal processing section 15 performs, with respect to the imaging signal, processing of white balance, brightness, color signal, camera-shake correction, and others.

The imaging signal processing section 15 is assumed as serving also as a so-called video processor, and being a portion for processing the imaging signal to achieve various types of display.

The imaging signal processing section 15 is capable of performing, for example, with respect to the imaging signal, adjustment of intensity level, contrast, and sharpness (edge enhancement), correction of color, and others. The imaging signal processing section 15 is also capable of generating scaled-up or scaled-down images being results of partially scaling up or down the imaging signal, and image effects processing including mosaicing, intensity inversion, soft focus, partial highlight display, and entire color tone change, for example. The imaging signal processing section 15 is also capable of processing of generating character images and concept images, synthesizing the generated images to any captured images, and others.

That is, the imaging signal processing section 15 can go through various types of processing with respect to a digital video signal being an imaging signal.

The imaging control section 11 exercises control over the imaging section 3 and the imaging signal processing section 15 in terms of operation, i.e., control over the imaging operation of the imaging function component C1. Such control is exercised based on a command coming from the system controller 10. For example, the imaging control section 11 exercises control over ON/OFF of the operation of the imaging section 3 and the imaging signal processing section 15. The imaging control section 11 is assumed as exercising control, i.e., motor control, over the imaging section 3 to go through operations of auto focus, automatic exposure adjustment, aperture adjustment, zoom, focus change, and others.

As described in the foregoing, when the imaging display apparatus 1 is provided with a movable mechanism that can move the direction of an object by the imaging lens 3a, the imaging control section 11 exercises control over the movable mechanism in terms of operation based on a command coming from the system controller 10 so that the direction of the imaging lens 3a is changed in the imaging section 3.

The imaging control section 11 is provided with a timing generator, and using a timing signal generated by the timing generator, exercises control over, in terms of signal processing operation, the solid-state imaging element and the components in the imaging signal processing section 11, i.e., the sample-hold/AGC circuit and the video A/D converter. Through such timing control, the imaging frame rate can be also controlled variable.

The imaging control section 11 exercises control over the solid-state imaging element and the imaging signal processing section 15 in terms of imaging sensitivity and signal processing. The imaging sensitivity control includes gain control over signals to be read from the solid-state imaging element, black-level setting control, varying coefficient control during processing of an imaging signal being yet digital data, and correction amount control during camera-shake correction processing, for example. The imaging sensitivity may be subjected to any entire sensitivity adjustment with no specific consideration for a wavelength band, or to any sensitivity adjustment for adjusting the imaging sensitivity of any specific wavelength band such as an infrared area or ultraviolet area, e.g., imaging of cutting off any specific wavelength band. The sensitivity adjustment in consideration of wavelength is possible by insertion of a wavelength filter in the imaging lens system, and by wavelength filter computation processing to an imaging signal. In these cases, the imaging control section 11 can exercise sensitivity control by insertion control over a wavelength filter, or by specifying a filter computation coefficient, for example.

The imaging control section 11 also exercises control over the imaging signal processing section 15 in terms of image processing operation based on a command coming from the system controller 10. That is, the imaging control section 11 makes the imaging signal processing section 15 go through the above-described various types of processing.

The image display device 1 is also provided with another set of the imaging section 3, the imaging control section 11, and the imaging signal processing section 15 as a second imaging function component C2.

The components in the second imaging function component C2, i.e., the imaging section 3, the imaging control section 11, and the imaging signal processing section 15, are basically the same as the components in the first imaging function component C1, i.e., the imaging section 3, the imaging control section 11, and the imaging signal processing section 15.

The imaging section 3 in the imaging function component C2 is provided with one of the imaging lenses 3a of FIG. 1A or FIGS. 2A and 2B, a lens system, a drive system, a solid-state imaging element array, and others. The lens system is configured to include an aperture, a zoom lens, a focus lens, and others. The drive system exercises control over the lens system to go through a focus operation and a zoom operation. The solid-state imaging element array detects an imaging light derived in the lens system, and generates an imaging signal through photoelectric conversion. The solid-state imaging element array is exemplified by a CCD sensor array, and a CMOS sensor array.

In the example of FIGS. 1A and 1B, similarly to the imaging function component C1, the imaging section 3 of the second imaging function component C2 capture the image of the view in front of a user. On the other hand, in the example of FIGS. 2A and 2B, the imaging section 3 of the second imaging function component C2 captures the image of the view in the direction different from that for the imaging function component C1, e.g., the view in the rear direction of the user.

The imaging signal processing section 15 of the imaging function component C2 is also configured to include a sample hold/AGC (Automatic Gain Control) circuit or a video A/D converter, and derives an imaging signal being digital data. The sample hold/AGC circuit performs gain adjustment and waveform shaping with respect to a signal derived by the solid-state imaging element in the imaging section 3. The imaging signal processing section 15 performs, with respect to the imaging signal, processing of white balance, intensity, color signal, camera-shake correction, and others. The imaging signal processing section 15 is assumed as serving also as a so-called video processor, and being a portion for processing the imaging signal to achieve various types of display. The imaging signal processing section 15 is capable of performing, for example, with respect to the imaging signal, adjustment of intensity level, contrast, and sharpness (edge enhancement), correction of color, and others. The imaging signal processing section 15 is also capable of generating scaled-up or scaled-down images being results of partially scaling up or down the imaging signal, and image effects processing including mosaicing, intensity inversion, soft focus, partial highlight display, and entire color tone change, for example. The imaging signal processing section 15 is also capable of processing of generating character images and concept images, synthesizing the generated images to any captured images, and others.

The imaging control section 11 exercises control over the imaging section 3 and the imaging signal processing section 15 in terms of operation, i.e., control over the imaging operation of the imaging function component C2. Such control is exercised based on a command coming from the system controller 10. For example, the imaging control section 11 exercises control over ON/OFF of the operation of the imaging section 3 and the imaging signal processing section 15. The imaging control section 11 is assumed as exercising control, i.e., motor control, over the imaging section 3 to go through operations of auto focus, automatic exposure adjustment, aperture adjustment, zoom, focus change, and others.

As described in the foregoing, when the imaging display apparatus 1 is provided with a movable mechanism that can move the direction of an object by the imaging lens(es) 3a, the imaging control section 11 exercises control over the movable mechanism in terms of operation based on a command coming from the system controller 10 so that the direction of the imaging lens(es) 3a is changed in the imaging section 3.

The imaging control section 11 is provided with a timing generator, and using a timing signal generated by the timing generator, exercises control over, in terms of signal processing operation, the solid-state imaging element and the components in the imaging signal processing section 11, i.e., sample-hold/AGC circuit and a video A/D converter. Through such timing control, the imaging frame rate can be also controlled variable.

The imaging control section 11 exercises control over the solid-state imaging element and the imaging signal processing section 15 in terms of imaging sensitivity and signal processing. The imaging sensitivity control includes gain control over signals to be read from the solid-state imaging element, black-level setting control, varying coefficient control during processing of the imaging signal being yet digital data, and correction amount control during camera-shake correction processing, for example. The imaging sensitivity may be subjected to any entire sensitivity adjustment with no specific consideration for a wavelength band, or to any sensitivity adjustment for adjusting the imaging sensitivity of any specific wavelength band such as an infrared area or ultraviolet area, e.g., imaging of cutting off any specific wavelength band. The sensitivity adjustment in consideration of wavelength is possible by insertion of a wavelength filter in the imaging lens system, and wavelength filter computation processing to an imaging signal. In these cases, the imaging control section 11 can exercise sensitivity control by insertion control over a wavelength filter, or by specifying a filter computation coefficient, for example.

The imaging control section 11 exercises control over the imaging signal processing section 15 in terms of image processing operation based on a command coming from the system controller 10. That is, the imaging control section 11 makes the imaging signal processing section 15 go through the above-described various types of processing.

These imaging function components C1 and C2 each supply a captured image signal being the result of imaging to the display image processing section 12 as a display image signal for use for display on the display section 2.

In the imaging display apparatus 1, the components in charge of display for a user include the display section 2, the display image processing section 12, a display drive section 13, and a display control section 14.

The display image signals derived in the imaging function components C1 and C2 are supplied to the display image processing section 12. In this case, the display image processing section 12 performs screen split and image synthesis for the aim of displaying the display image signals provided by the imaging function components C1 and C2, i.e., two image sources (image signal generation means) all at once on the display section 2.

For example, the display image processing section 12 sets a screen area to the display section 2 as picture-in-picture screen, split screen, and others, and makes the resulting areas display therein images of the display image signals provided by the imaging function components C1 and C2.

The display drive section 13 is configured by a pixel drive circuit for making the display section 2 display the image signals coming from the display image processing section 12. The display section 2 is a liquid crystal display. That is, for display as such, pixels in matrix in the display section 2 are each applied with a drive signal based on a video signal. The signal application is made at any predetermined horizontal/vertical drive timing.

Note here that the display drive section 13 exercises control over the display section 2 in terms of pixel transmittance to put the screen in the through state entirely or partially.

The display control section 14 exercises control over the display image processing section 12 in terms of processing operation, and over the display drive section 13 in terms of operation based on a command coming from the system controller 10.

For each of the imaging function components C1 and C2, an illumination section 4 and an illumination control section 18 are provided. The illumination section 4 is configured by the light-emitting section 4a of FIGS. 1A to 2B, and a light-emitting circuit that illuminates the illumination section 4, e.g., LED. The illumination control section 18 makes the illumination section 4 go through the light-emitting operation based on a command coming from the system controller 10.

With the light-emitting section 4a attached as shown in FIGS. 1 and 2 examples in the illumination section 4, the illumination section 4 goes through the illumination operation with respect to the direction of an object by the imaging lens(es) 3a.

The operation trigger information generation section 16 generates operation trigger information for starting or ending image display on the display section 2, for display mode change, and others.

This operation trigger information generation section 16 can be configured by an operation piece and an operation detection mechanism. The operation piece is an operation key or an operation dial that is operated by a user, for example, and the operation detection mechanism detects how the operation piece is operated. This configuration is for a case where the operation trigger information about various types of operations is the user's manual operation. The operation trigger information generation section 16 supplies the user's operation information as the operation trigger information to the system controller 10 so that the system controller 10 exercises control over a display operation in response to the user's operation.

Alternatively, the operation trigger information generation section 16 may be so configured as to be able to detect any user information and outside world information. The user information is detection information about user's range of vision, body behavior, state of body, and others, and the outside world information is detection information about the environment around the imaging display apparatus, location, date and time, and circumstances surrounding an object, and others. For example, the system controller 10 may take charge of determining whether to generate an operation trigger or not based on such user information and outside world information. The examples of the user information and the outside world information will be described later.

Figure 5:
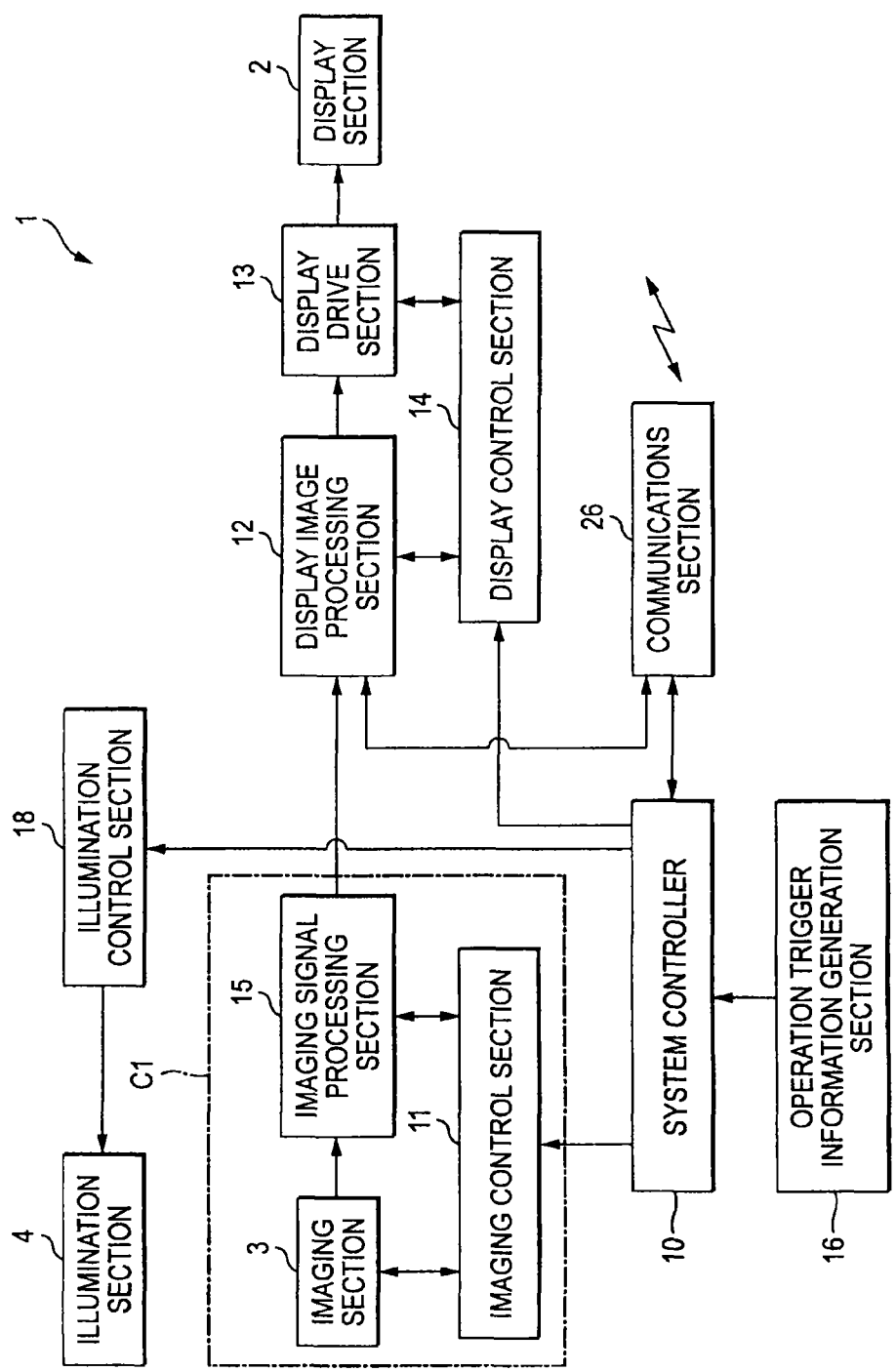
FIG. 5 is another block diagram showing the imaging display apparatus of the embodiment.

FIG. 5 shows another exemplary configuration of the imaging display apparatus 1. Note here that any function block same as that of FIG. 4 is provided with the same reference numeral, and not described twice.

Compared with the configuration of FIG. 4, the configuration of FIG. 5 does not include the second imaging function component C2 and the components provided corresponding to the second imaging function component C2, i.e., the illumination section 4 and the illumination control section 18, but newly includes a communications section 26.

The communications section 26 performs data transmission/reception with any external devices. The external devices include a computer device, a mobile phone, a PDA (Personal Digital Assistant), an AV (Audio-Visual) equipment including a video storage device, a television receiver, and others, and a network server device, for example.

The communications section 26 may be so configured as to perform network communications, in mode of wireless LAN or Bluetooth, via close-range wireless communications with respect to network access points, for example. Still alternatively, the communications section 26 may perform wireless communications directly with any external device provided with any corresponding communications function.

Figure 6A:
FIGS. 6A to 6C are each a diagram showing the relationship between the imaging display apparatus of the embodiment and an external device(s)
Figure 6B:
Figure 6C:
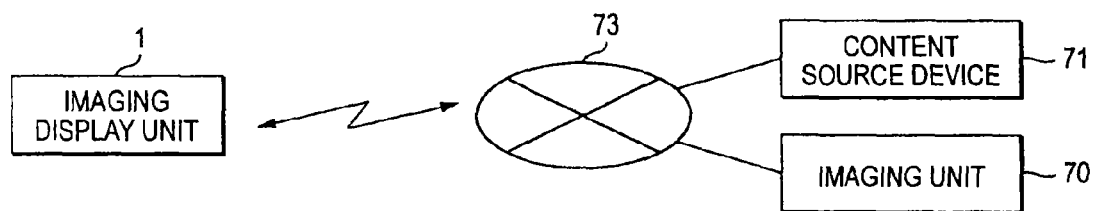

In FIG. 5 example, the communications section 26 performs communications with an external device as shown in FIGS. 6A to 6C, and receives image data from the external device. The communications section 26 then provides the received image data to the display image processing section 12 as a display image signal for use for display on the display section 2. The image signal being the result of processing in the display image processing section 12 is provided to the display drive section 13 for display on the display section 2.

FIGS. 6A to 6C each show the state of use of the imaging display apparatus 1 in relation to the external device.

FIG. 6A shows an example in which the imaging display apparatus 1 performs communications with an imaging apparatus 70 being an external device using the communications section 26. In this case, the imaging display apparatus 1 receives an image captured by the imaging apparatus 70, and makes the display section 2 display the image thereon. The external imaging apparatus 70 is exemplified by a video camera, a digital still camera, and others provided with a communications capability. Alternatively, any other imaging display apparatuses 1 similar to that in this embodiment may serve as the external imaging apparatus 70.

The external imaging apparatus 70 may vary in type, e.g., an imaging apparatus owned by a user using the imaging display apparatus 1, an imaging apparatus owned by a friend of a user using the imaging display apparatus 1, an imaging apparatus belonging to any public or service corporations being an source of images or others and being available for communications with the imaging display apparatus 1.

FIG. 6B shows an example in which the imaging display apparatus 1 is provided with the communications capability, and communicates with an external content source device 71. In this case, the imaging display apparatus 1 receives images, i.e., moving/still images, coming from the content source device 71 for display on the display section 2.

The content source device 71 is exemplified by video equipment, television tuner, AV (Audio-Visual) equipment such as home server device, information processor such as personal computer, PDA (Personal Digital Assistant), mobile phone, and others. Such a content source device 71 also varies in type, e.g., a device owned by a user or a friend of a user using the imaging display apparatus 1, or a server device belonging to any public or service corporations being a source of various types of contents or others.

The data to be forwarded from the content source device 71 to the imaging display apparatus 1 varies in type for display use, e.g., moving image contents such as movies and video clips, still image contents captured by a digital still camera or others and recorded on a recording medium, data such as E-book, image data created by a user using a personal computer or others, text data, computer-use data such as spreadsheet data, and game image.

FIG. 6C shows an example in which the communications section 26 in the imaging display apparatus 1 is provided with a communications access capability over a network 73 such as the Internet, and performs communications with the external imaging apparatus 70 and the content source device 71 connected over the network 73. In this case, the imaging display apparatus 1 receives image data over the network 73, and based on the received image data, makes the display section 2 perform image display using a display image signal.

Figure 7:
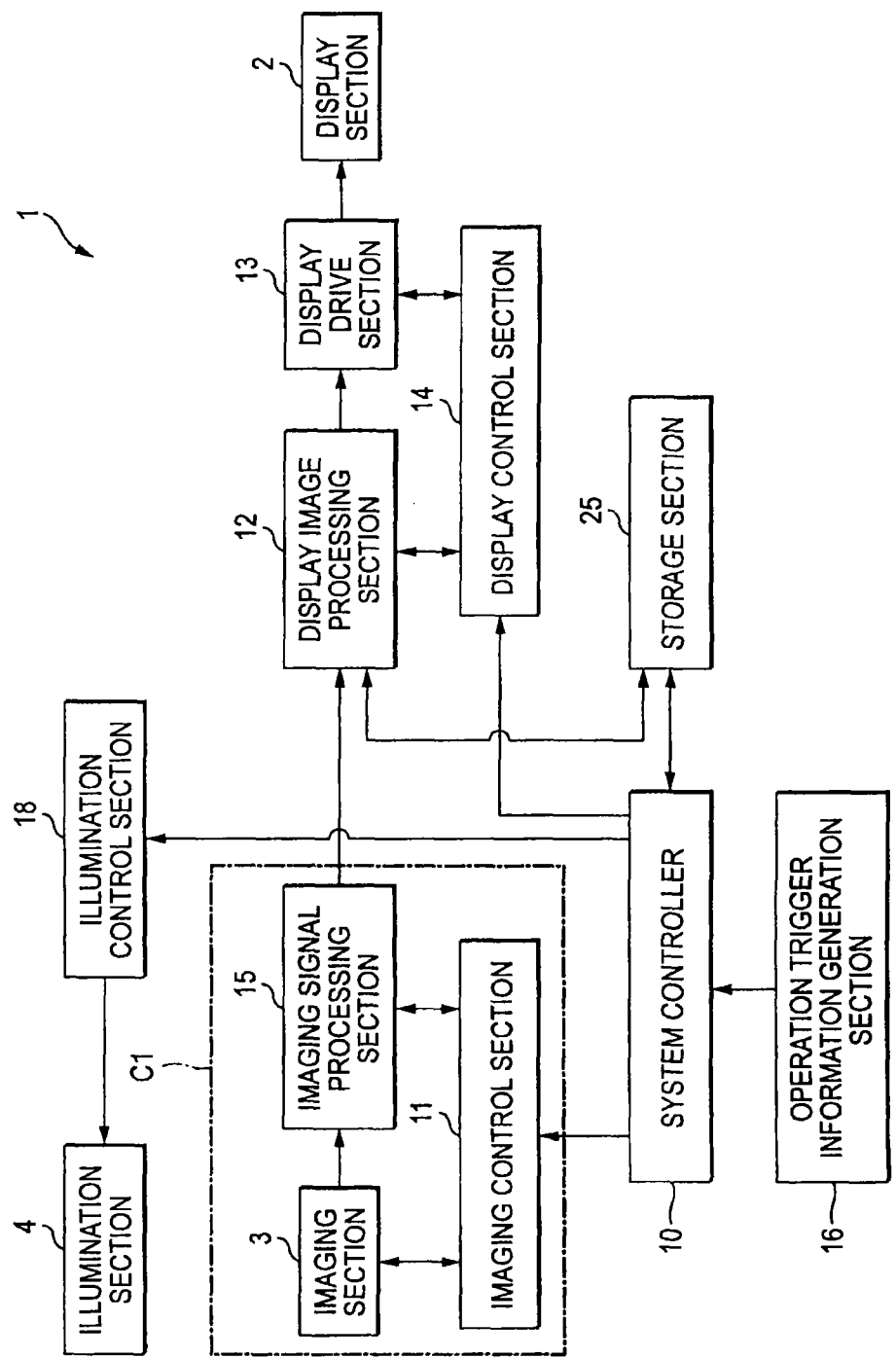
FIG. 7 is still another block diagram showing the imaging display apparatus of the embodiment.

FIG. 7 shows another exemplary configuration of the imaging display apparatus 1. Note here that any function block same as that of FIGS. 4 and 5 is provided with the same reference numeral, and not described twice.

Compared with the configuration of FIG. 4, the configuration of FIG. 7 does not include the second imaging function component C2 and the components provided corresponding to the second imaging function component C2, i.e., the illumination section 4 and the illumination control section 18, but newly includes a storage section 25.

The storage section 25 is a portion where data is recorded and reproduced to/from any predetermined recording medium. The storage section 25 is implemented by an HDD (Hard Disk Drive), for example. The recording medium surely varies in type, e.g., solid-state memory such as flash memory, memory card equipped with a solid-state memory, optical disk, magneto-optical disk, and holographic memory. The storage section 25 may be so configured as to be able to perform recording and reproduction in accordance with the type of a recording medium for use.

The image data is to be supplied to the storage section 25 via an image input/output control section 27. The image data here includes data of an image captured by the imaging section 3 of the imaging function component C1 and processed by the imaging signal processing section 15 as an imaging signal, and image data received by the communications section 26. The audio data is to be supplied to the storage section 25 via an audio input/output control section 28. The audio data here includes audio data derived by an audio input section 6, and audio data received by the communications section 26.

Being under the control of the system controller 10, the storage section 25 reproduces image data from a recording medium. The image data being the reproduction result is supplied to the display image processing section 12 as a display image signal for use for display on the display section 2. The image signal being the processing result of the display image processing section 12 is supplied to the display drive section 13, and is displayed on the display section 2.

The data to be reproduced by the storage section 25 varies in type for use, e.g., moving image contents such as movies and video clips, still image contents captured by a digital still camera or others and recorded on a recording medium, data such as E-book, image data created by a user using a personal computer or others, text data, computer-use data such as spreadsheet data, and game image.

Figure 8:
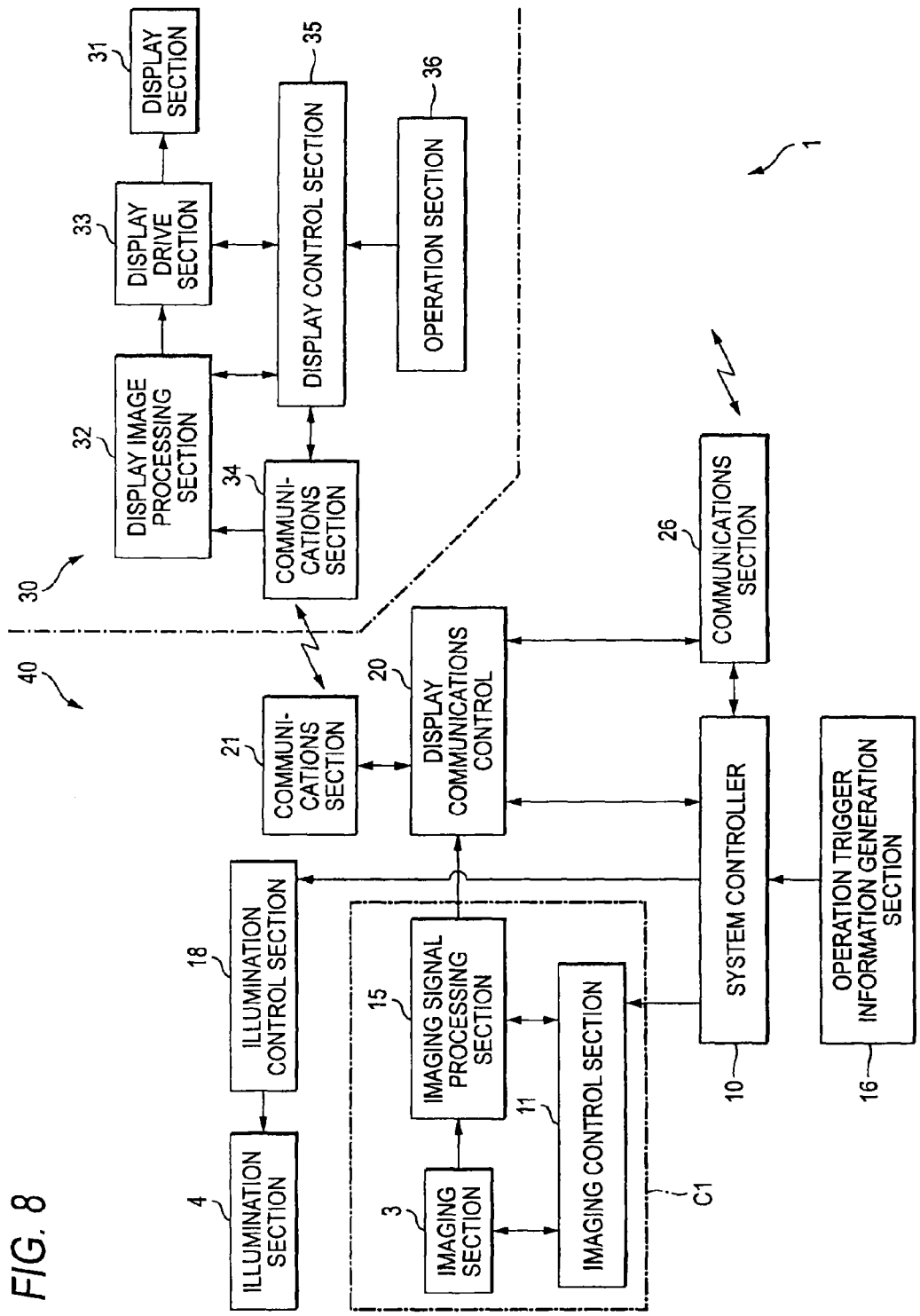
FIG. 8 is still another block diagram showing the imaging display apparatus of the embodiment.

FIG. 8 shows still another exemplary configuration of the imaging display apparatus 1, i.e., corresponding to FIG. 3 example in which the imaging unit section 40 is provided separately from the display unit section 30.

In this example, similarly to FIG. 5, the imaging unit section 40 includes the imaging function component C1, and the communications section 26.

The display image signals to be derived by the image function component C1 and the communications section 26 are supplied to a display communications control section 20. The display communications control section 20 performs encoding processing for communications with the display unit section 30, i.e., encodes the display image signals coming from the image function component C1 and the communications section 26.

The image data being the encoding result of the display communications control section 20 is forwarded from the communications section 21 to the display unit section 30.

The display unit section 30 is provided with a communications section 34, a display section 31, a display image processing section 32, a display drive section 33, a display control section 35, and an operation section 36.

The communications section 34 performs data communications with the communications section 21 of the imaging unit section 40, i.e., receives image data and performs decoding processing. The image data here is the one coming from the imaging unit section 40, i.e., the image data being the display image signals derived by the image function component C1 and the communications section 26.

The display image signal being the decoding result of the communications section 34 is supplied to the display image processing section 12. In this case, the display image processing section 12 goes through processing of screen split and image synthesis for displaying the display image signals coming from the image function component C1 and the communications section 26, i.e., two image signal sources (image signal generation means) all at once on the display section 31.

For example, the display image processing section 12 sets a screen area to the display section 31 as picture-in-picture screen, split screen, and others, and makes the resulting areas display therein images of the display image signals provided by the imaging function component C1 and the communications section 26.

The display drive section 33 is configured by a pixel drive circuit for making the display section 31 display thereon image signals coming from the display image processing section 32. The display section 31 is a liquid crystal display. That is, for display as such, pixels in matrix in the display section 31 are each applied with a drive signal based on a video signal. The signal application is made at any predetermined horizontal/vertical drive timing.

The display control section 35 exercises control over the display image processing section 32 in terms of processing operation, and over the display drive section 33 in terms of operation. For example, the display control section 35 exercises control over ON/OFF of the display operation and area configuration change on the screen in response to a user's operation made through the operation section 36.

When command information from the system controller 10 is provided by communications established between the communications sections 21 and 34, in response to the command information from the system controller 10, the display control section 35 may exercise control over ON/OFF of display operation, area configuration change on the screen, and others.

As such, described above are the exemplary configurations of the imaging display apparatus 1 by referring to FIGS. 4, 5, 7, and 8.

FIG. 4 is an example in which the two imaging function components C1 and C2 are provided each as an image source (image signal generation means) for generating a display image signal for display on the display section 2.

FIG. 5 is an example in which the imaging function component C1 and the communications section 26 are provided each as an image source (image signal generation means) for generating a display image signal for display on the display section 2.

FIG. 7 is an example in which the imaging function components C1 and the storage section 25 are provided each as an image source (image signal generation means) for generating a display image signal for display on the display section 2.

FIG. 8 is an example in which the imaging function components C1 and the communications section 26 are provided each as an image source (image signal generation means) for generating a display image signal similarly to the example in FIG. 5, and the imaging unit section 40 and the display unit section 30 are provided separately from each other.

These configuration examples are not surely restrictive, and various other configurations are also possible for the imaging display apparatus 1.

Although exemplified above is the example in which two image sources are provided, this is surely not restrictive, and three or more image sources may be provided.

A possible configuration may include the imaging function component C1, the communications section 26, and the storage section 25, or three or more imaging function components C1, C2, C3, and others.

In the embodiment, at least one of a plurality of image sources is assumed as capturing the image of the view in the field of view direction of a user. That is, the imaging function component C1 in each of the configuration examples is in charge of such imaging, and a display image signal derived by the imaging function component C1 is an imaging signal for the field of view direction of a user.

The remaining image sources are each in charge of generating a display image signal for displaying an image different from the image captured by the imaging function component C1.

Herein, the image of the display image signal derived by the imaging function component C1, i.e., the image different from the image captured for the view in the field of view direction of a user, can be acquired in various manners.

When the imaging function component C2 is covering the direction different from the direction covered by the imaging function component C1, for example, the image captured by the imaging function component C2 itself is different from the image captured by the imaging function component C1. The image received by the communications section 26 and the image reproduced by the storage section 25 are also different from the image captured by the imaging function component C1.

Even when the imaging function component C2 is covering the direction same as that of the imaging function component C1 as in the example of FIGS. 1A and 1B, i.e., the field of view direction of a user, the resulting image of the imaging function component C2 may be different from that of the imaging function component C1 depending on the manner of imaging operation and the imaging signal processing.

In this embodiment, the display image signals from these image sources are displayed on the display section 2 all at once, thereby providing various many images to a user.

3. Area Configuration on Screen

FIGS. 9A to 10C each show an exemplary area configuration when images of display image signals from a plurality of image sources are displayed on the screen of the display section 2 all at once.

In the display section 2 (in FIG. 8 example, the display section 31 of the display device 30), to display images from a plurality of image sources all at once, the screen may be set with a master screen area and a slave screen area, or may be split into a plurality of areas.

In FIGS. 9A to 9F, areas AR1 and AR2 each denote an area for display of images provided by each different image source.

Figure 9A:
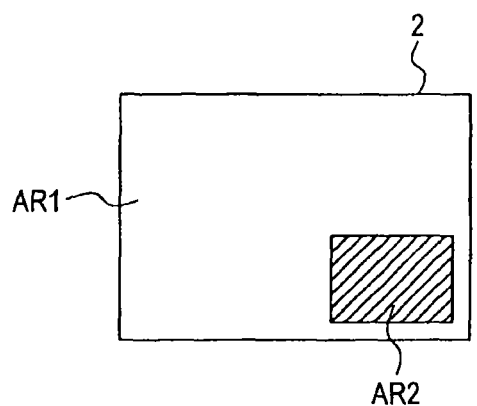
FIGS. 9A to 9F are each a diagram showing the area configuration of a display section in the embodiment.

FIG. 9A shows an example in which the area AR2 is set to the lower right portion in the screen area, i.e., the area AR1, of the display section 2 for use as a slave screen, and the areas AR1 and AR2 both take charge of image display.

Figure 9B:
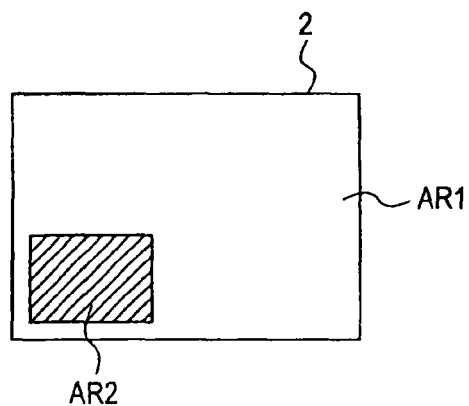

FIG. 9B shows an example in which the area AR2 is set to the lower left portion in the screen area, i.e., the area AR1, of the display section 2 for use as a slave screen, and the areas AR1 and AR2 both take charge of image display.

Although not shown, with a slave screen set as such, there are various other placements are possible for the area AR2 being a slave screen in the area AR1, e.g., upper right, upper left, center, right of center, and left of center.

Figure 9C:
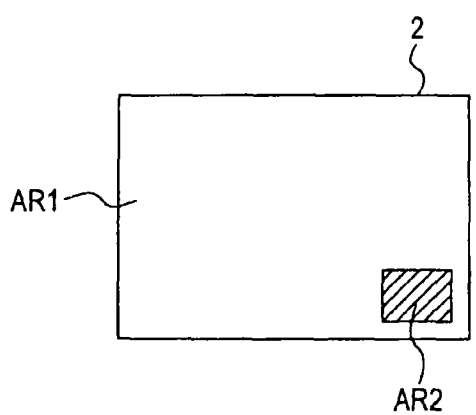

FIG. 9C shows an example in which the area AR2 is reduced in size.

Figure 9D:
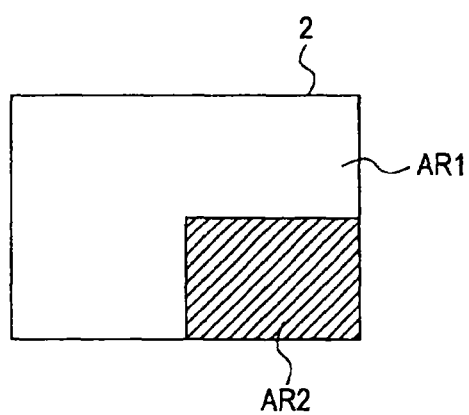

FIG. 9D shows an example in which the area AR2 is increased in size.

Figure 9E:
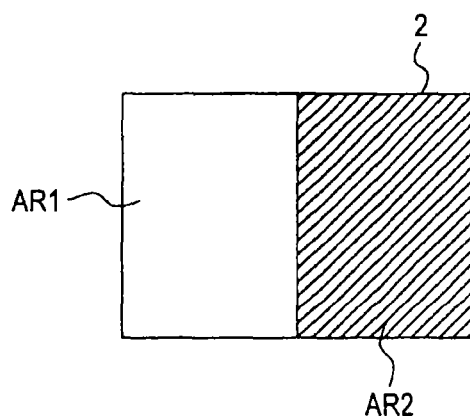

FIG. 9E shows an example in which the screen area of the display section 2 is equally split, and the resulting areas AR1 and AR2 are placed next to each other.

Figure 9F:
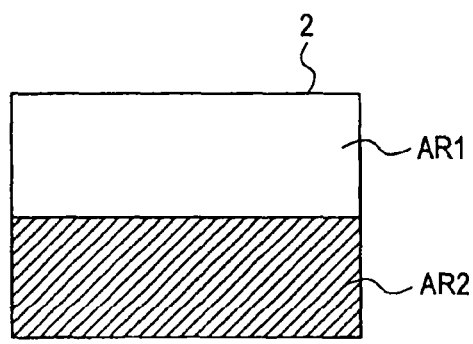

FIG. 9F shows an example in which the screen area of the display section 2 is equally split, and the resulting areas AR1 and AR2 are placed one on the other.

For image display in the configurations of FIGS. 4 to 8, for example, with the area configurations as in FIGS. 9A to 9F, the area AR1 may display an image of the user's field of view with an image source of the imaging function component C1, and the area AR2 may display an image provided by any other image sources, e.g., the imaging function component C2, the communications section 26, and the storage section 25.

The system controller 10 may refer to the information provided by the operation trigger information generation section 16, e.g., user's operation information, user information, outside world information, to select any of the area configurations of FIGS. 9A to 9F for image display, or change the area configurations thereamong. For example, the system controller 10 may change the position of the area AR2 being a slave screen as shown in FIGS. 9A and 9B in response to the user's operation, may change the size of the area AR2 as shown in FIGS. 9C and 9D, or may equally split the screen of the display section 2 as shown in FIGS. 9E and 9F, thereby being able to meet the user's preferences.

For so-called display area configuration change, the areas AR1 and AR2 in FIGS. 9A to 9F may be changed in position, and the area AR2 may display an image of the user's field of view with the imaging function component C1 being an image source, and the area AR1 may display an image of any other image sources, i.e., the imaging function component C2, the communications section 26, and the storage section 25.

Figure 10A:
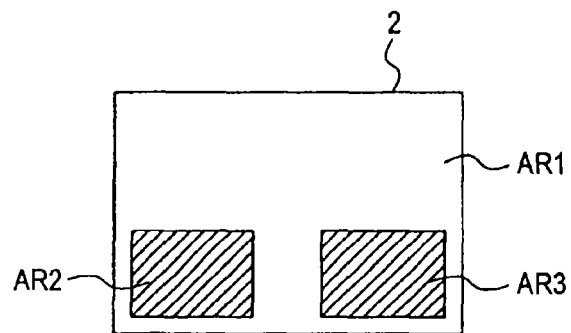
FIGS. 10A to 10C are each a diagram showing another area configuration of the display section in the embodiment.
Figure 10B:
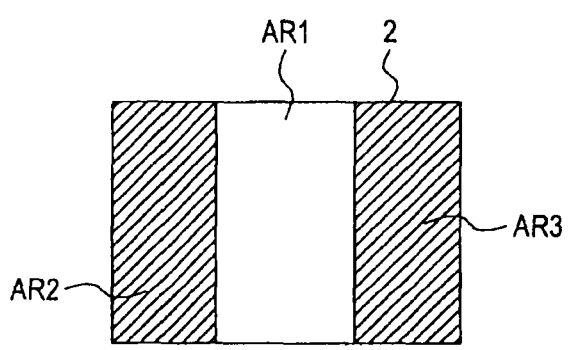
Figure 10C:
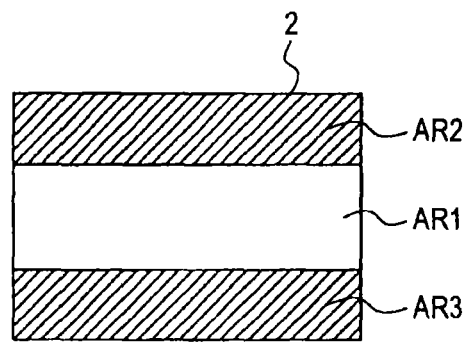

FIGS. 10A to 10C each show an exemplary area configuration in the screen of the display section 2 with three image sources, and in FIGS. 10A to 10C, areas AR1, AR2, AR3 each denote an area for display of images, i.e., display image signals, provided by each different image source.

FIG. 10A shows an example in which the area AR2 is set to the lower left portion in the screen area of the display section 2, i.e., the area AR1, and the area AR3 is set to the lower right portion therein for use each as a slave screen, and the areas AR1, AR2, AR3 each take charge of image display.

FIG. 10B shows an example in which the area AR2 is set to the left of the area AR1 in the screen area of the display section 2, and the area AR3 is set to the right thereof, and the areas AR1, AR2, AR3 each take charge of image display.

FIG. 10C shows an example in which the area AR2 is set to above the area AR1 in the screen area of the display section 2, and the area AR3 is set to below thereof, and the areas AR1, AR2, AR3 each take charge of image display.

Although not shown, the screen of the display section 2 may be equally split to have the areas AR1, AR2, AR3 of the same size.

Similarly to the cases of FIGS. 9A to 9F, the area configurations of FIGS. 10A to 10C are also changed or the areas are changed in position under the control of the system controller 10.

Note here that, in a case where three or more of an image source are provided, two of those may be selected for image display with the area configurations as in FIGS. 9A to 9F.

This is surely not restrictive, and when four or more of an image source are provided, images from these image sources may be each displayed or images of any selected two or more of the image sources may be displayed.

When the two display sections 2 are provided for right and left eyes, respectively, as shown in FIGS. 1A and 2B, one of the screens of the display sections 2 may display an image provided by one of the image sources, and the remaining screen may display an image of the remaining image source.

Moreover, image display may be made on each of a plurality of screens of a multi-screen display, e.g., two-screen display of a commercially-available portable game machine.

4. Exemplary Display Operation

In the imaging display apparatus 1 varying in configuration as shown in FIGS. 4 to 8 in the embodiment, display image signals coming from a plurality of image sources are displayed on the display section 2. One of the image sources is the imaging function component C1 and captures an image of the view in the field of view direction of a user, and the remaining image sources generate a display image signals being images different from the image captured by the imaging function component C1. As such, the user's visual capability can be enhanced, and the resulting display will look interesting.

Described next are the control application by the system controller 10, and exemplary various display operations thereby.

Figure 11:
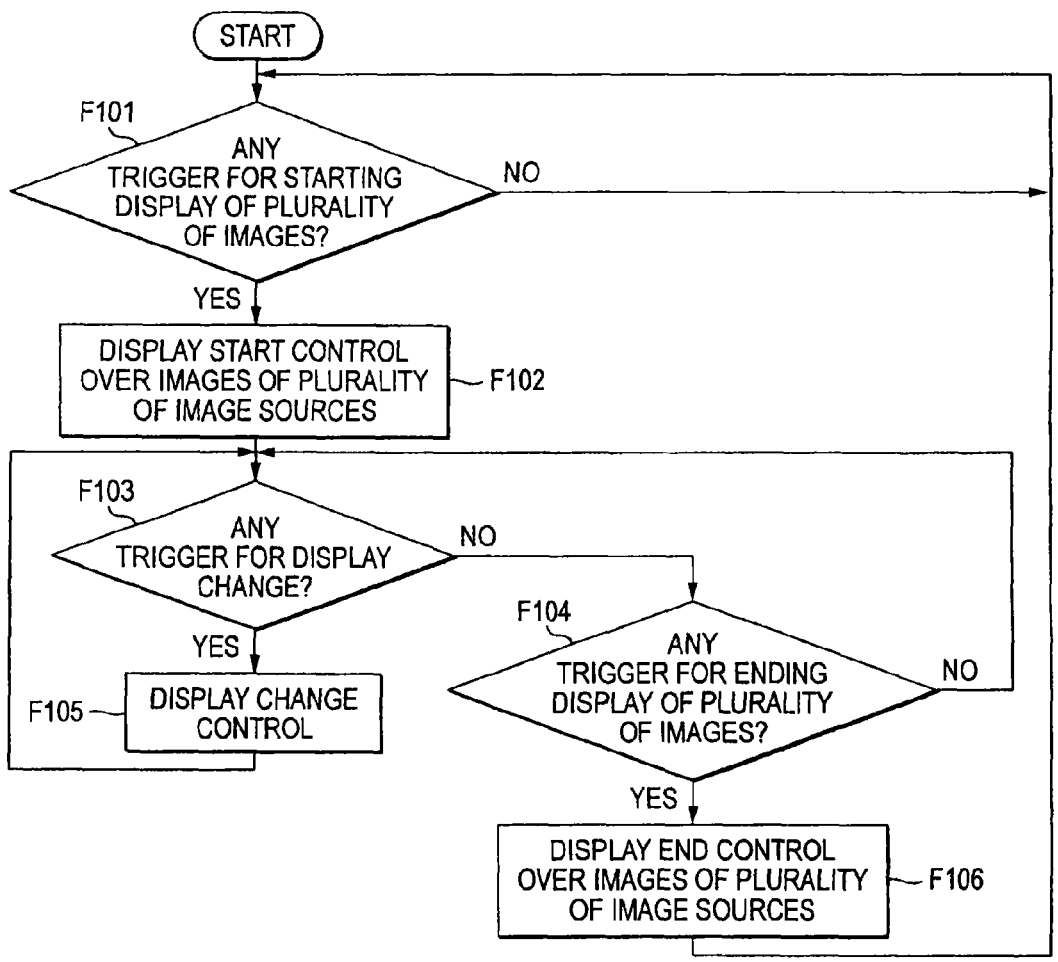
FIG. 11 is a flowchart of a control process of the embodiment.

FIG. 11 shows the control processing to be performed by the system controller 10.

In step F101, the system controller 10 determines whether a display start trigger is generated for a plurality of images. For such a determination, for example, an operation piece may be provided as the operation trigger information generation section 16 to make it available for user's operation, and when the user operates such a predetermined operation piece, the system controller 10 may determine that a trigger is generated for starting display of a plurality of images. Alternatively, although the details are left for later description, the operation trigger information generation section 16 may detect the state of a user or the state of the outside world, and based on any predetermined requirements, the system controller 10 may determine that a trigger is generated for starting display of a plurality of images.

Note here that in the period of time until such a display start trigger is generated for a plurality of images, the display section 2 may be controllably put in the through state, or the image captured by the imaging function component C1 may be controllably solely displayed on the display section 2, for example.

Alternatively, when the imaging display apparatus 1 is turned ON, a plurality of images may be responsively displayed, and with such a trigger, the imaging display apparatus 1 may always display a plurality of images.

When a determination is made that a display start trigger is generated for displaying a plurality of images, the procedure goes to step F102, and the system controller 10 exercises control to start displaying a plurality of display image signals. That is, the system controller 10 exercises control over the display section 2 to make image display with the display image signal provided by the imaging function component C1 and the display image signal provided by any other image sources.

If with the configuration of FIG. 4, the imaging operation of the imaging function components C1 and C2 is started in step F102, and the display image signals of the imaging function components C1 and C2 are supplied to the display image processing section 12. With the area configurations of FIGS. 9A to 9F, the display section 2 is so controlled as to display thereon the resulting images.

Note here that when the imaging function components C1 and C2 are covering each different direction as the direction of an object as shown in FIGS. 2A and 2B, an image normally captured by the imaging function component C2 will be different from that of the imaging function component C1 so that the display section 2 displays thereon various images on its screen split into a plurality of areas.

On the other hand, as shown in FIGS. 1A and 1B, when the imaging function components C1 and C2 are covering the same direction as the direction of an object, the system controller 10 issues a command of directing the manner of imaging operation and signal processing in the imaging function component C2. With such control application to make the imaging function components C1 and C2 capture each different image so that the display section 2 displays thereon various images on a plurality of areas.

With the configuration of FIG. 5, in step F102, the imaging operation of the imaging function component C1 is started, and the resulting display image signal captured by the imaging function component C1 is supplied to the display image processing section 12. The image data received by the communication section 26 is also supplied to the display image processing section 12 as a display image signal. Thereafter, with the area configurations as described by referring to FIGS. 9A to 9F, the display section 2 is so controlled as to display thereon the images.

Alternatively, with the configuration of FIG. 5, when the communications section 26 is provided with image data from an external device, it is determined that a display start trigger is generated in step F101, and image display may be started in step F102 with the imaging function component C1 and the communications section 26 both being the images sources. In the period of time when the communications section 26 is receiving no image data, the display section 2 may be so controlled as to display thereon solely the display image signal provided by the imaging function component C1, for example.

With the configuration of FIG. 7, the imaging operation of the imaging function component C1 is started in step F102, and the resulting display image signal captured by the imaging function component C1 is supplied to the display image processing section 12. Also in step F102, a command is issued for the storage section 25 to perform the reproduction operation, and the resulting reproduced image data is supplied to the display image processing section 12 as the display image signal. Thereafter, with the area configurations as described by referring to FIGS. 9A to 9F, the display section 2 is so controlled as to display thereon the images. Note that, with the configuration of FIG. 7, when a reproduction start trigger is generated for the storage section 25 in response to the user's operation, the state of a user, the state of the outside world, and others, it is determined in step F101 that a display start trigger is generated. With such a determination, in step F102, the image display may be started with the imaging function component C1 and the storage section 25 both being the image sources. In the period of time when the storage section 25 is not in the process of reproduction, the display section 2 may be so controlled as to display thereon solely the display image signal provided by the imaging function component C1, for example.

When display of a plurality of images is started with the area configurations of FIGS. 9A to 10C, for example, the system controller 10 monitors whether a display change trigger is generated in step F103, and monitors whether a display end trigger is generated for a plurality of images in step F104.

Generation of a display change trigger in step F103 means a case that the system controller 10 determines to make a display image change based on the user operation, or the state of a user, or the state of the outside world.

The display image change includes a content change of one or more of the images, and an area configuration change.

The content change of the display images widely varies, and includes image change as a result of zoom processing and a focus position change in the imaging sections 3 of the imaging function components C1 and C2, image change as a result of an imaging sensitivity change, image change as a result of signal processing in the imaging signal processing section 15, image change as a result of an imaging direction change (direction of an object) if with the imaging section 3 being a movable camera, image change as a result of image source change if with three or more image sources of a display image signal, and others.

The area configuration change includes the position change in a picture-in-picture screen, the position change between master and slave screens, the position change or shift of screens being the result of screen split, the change to the entire screen display, and others. With such an area configuration change, controllably, the state of FIG. 9A is changed to the state of FIG. 9B, or the state of FIG. 9A is changed to the state of FIG. 9E, for example.

As to the display end trigger for a plurality of images in step F104, when a user operates a predetermined operation piece to end the image display, for example, the system controller 10 may determine it as generation of a trigger for ending the display of a plurality of images in the current state. Alternatively, the system controller 10 may detect the state of a user or the state of the outside world, and in accordance with any predetermined requirements, determine that a trigger is generated for starting display of a plurality of images.

When the system controller 10 determines that a display change trigger is generated in step F103, the procedure goes to F105, and the system controller 10 exercises change control over the image display operation. This accordingly change the details of the image(s) displayed in some area of the display section 2, i.e., one or both of the areas AR1 and AR2, or change the area configuration of the display section 2.

After step F105, i.e., the control application over display change, the system controller 10 keeps monitoring any trigger generation in steps F103 and F104.

When the system controller 10 determines that a display end trigger is generated for a plurality of images in step F104, the procedure goes to F106, thereby ending the operation of displaying, on the display section 2 all at once, the images provided by a plurality of image sources.

Such display end control varies, and includes display change to display only an image provided by the imaging function component C1, image display termination on the display section 2, or state change of the display section 2, e.g., through state, by image display termination on the display section 2, or power OFF for example.

With such control exercised by the system controller 10 as shown in FIG. 11, the display section 2 accordingly display thereon images from a plurality of images all at once.

Described below is exemplary simultaneous display of images provided by a plurality of image sources by referring to FIG. 12 and thereafter.

By referring to FIGS. 12A to 13C, with imaging display apparatus 1 in the exemplary configurations of FIGS. 1A and 1B and FIG. 4, described now is a case where the imaging function components C1 and C2 are so configured as to capture images of the view in front of a user, i.e., in the field of view direction of a user.

Figure 12A:
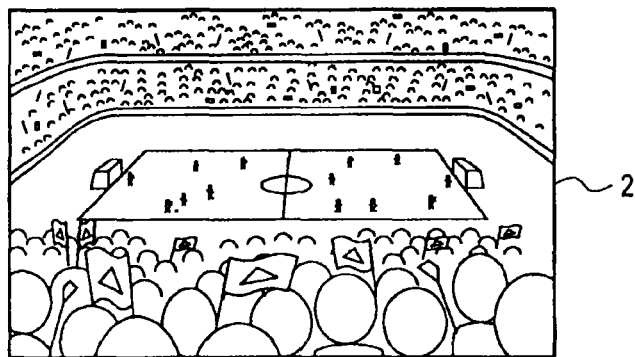
FIGS. 12A to 12C are each a diagram showing an image display state of the embodiment.

FIG. 12A shows normal image display fully on the screen of the display section 2, e.g., only an image normally captured by the imaging function component C1 is displayed on the display section 2.

Figure 12B:
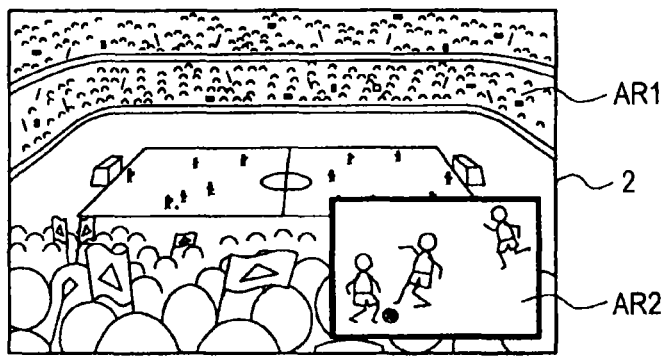

On the other hand, FIG. 12B shows simultaneous image display on the display section 2, i.e., images provided by a plurality of image sources are displayed all at once by the operation of this embodiment. With such simultaneous image display, the display image signal of an image normally captured by the imaging function component C1 is displayed in the area AR1, and at the same time, the display image signal of an image captured by the imaging function component C2 is displayed in the area AR2. The system controller 10 is exercising operation control over the imaging section 3 of the imaging function component C2 in terms of telephoto zoom. With telephoto imaging performed by the imaging function component C2, the image of the area AR2 looks different from the image of the area AR1. Accordingly, while looking at the normal view, the user can enjoy also the telephoto image that is not available with normal sense of sight.

Exemplified here is the case that the imaging function component C2 offers a telephoto image. Alternatively, by the imaging function component C2 performing wide-angle zooming, the area AR2 can display therein a wide-angle image of the close-range view. To derive such telephoto images and wide-angle images, in addition to the drive control exercised over the zoom lens in the imaging section 3 of the imaging function component C2, the signal processing will do in the imaging signal processing section 15 in the imaging signal component C2.

Although not shown, alternatively, images in a close or long range may be captured for display in the area AR2 of the display section 2. Such imaging may be performed in response to a command issued by the system controller 10 not for zooming but for a focus point change in the imaging section 3 of the imaging function component C2.

Also exemplified above is the case where an image captured by the imaging function component C1, i.e., an image normally captured for the view in the field of view direction of a user, is displayed in the area AR1, and an image captured by the imaging function component C2 is displayed in the area AR2. Alternatively, an image by the imaging function component C1, i.e., an image normally captured for the view in the field of view direction of a user, may be displayed in the area AR2, and an image by the imaging function component C2, e.g., telephoto image, may be displayed in the area AR1.

Exemplified below are examples in which an image by the imaging function component C1, i.e., an image normally captured for the view in the field of view direction of a user, is displayed in the area AR1, and an image by any other image sources, i.e., an image looking different from the image of the imaging function component C1, is displayed in the area AR2. In all of these examples, an image by the imaging function component C1, i.e., an image normally captured for the view in the field of view direction of a user, may be displayed in the area AR2, and an image by any other image sources, i.e., an image looking different from the image of the imaging function component C1, may be displayed in the area AR1.

Figure 12C:
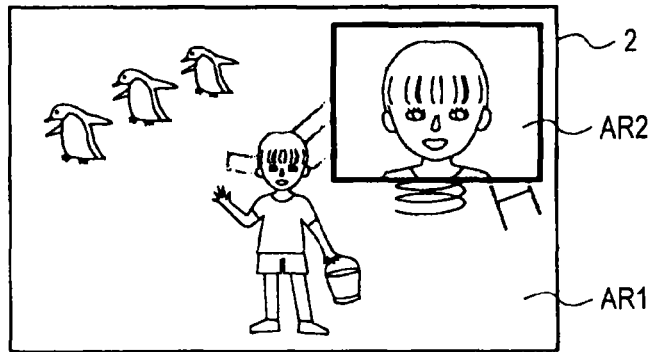

FIG. 12C shows an example in which the display image signal of an image normally captured by the imaging feature component C1 is displayed in the area AR1, and at the same time, an image captured by the imaging feature component C2 is scaled up, and the resulting display image signal is displayed in the area AR2. Such image display is implemented by the system controller 10 issuing a command for the imaging signal processing section 15 of the imaging function component C2 to scale up the image provided by the imaging section 3.

Also with such image display, while looking at the normal view, the user can enjoy also the scaled-up image that is not available with normal sense of sight.

Alternatively, the system controller 10 may issue a command for the imaging function component C2 to scale down the image provided by the imaging section 3, and display the resulting scaled-downed image in the area AR2.

FIG. 12A shows a case with the dimly-lit environment. An image normally captured by the imaging function component C1 is displayed in the area AR1. On the other hand, when the environment is dimly lit as such, the system controller 10 issues a command for the imaging control section 11 (the imaging section 3, and the imaging signal processing section 15) of the imaging function component C2 to increase the imaging sensitivity, or a command for adjustment of brightness level, contrast, and sharpness. With such a command, the resulting display image signal can be more enhanced with higher brightness, and an image of such a display image signal is displayed in the area AR2. With the brightness-adjusted image displayed as such, the area AR2 displays therein the image looking different from the normally-captured image displayed in the area AR1 so that the user can see the images that are usually not available therefor.

On the other hand, when the environment is too bright, the system controller 10 may issue a command for the imaging control section 11 (the imaging section 3, and the imaging signal processing section 15) of the imaging function component C2 to reduce the imaging sensitivity, or a command for adjustment of brightness level, contrast, and sharpness. Such a command prevents the image of the resulting display image signal from being glared, and an image of such a display image signal may be displayed on the area AR2.

Figure 13A:
FIGS. 13A to 13C are each a diagram showing another image display state of the embodiment.
Figure 13B:
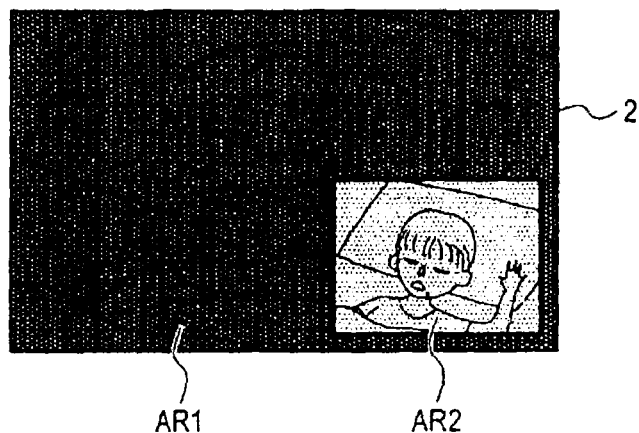

FIG. 13B shows a case where a user is in a dark bedroom where his or her child is sleeping, and the room is pitch dark and not visible with the image normally captured by the imaging function component C1 for display on the area AR1. When the system controller 10 issues a command for the imaging control section 11 (the imaging section 3, and the imaging signal processing section 15) of the imaging function component C2 to increase the infrared sensitivity, the area AR2 accordingly displays therein the image in which the infrared sensitivity is thus increased. That is, with the resulting image display, the user can see the child's sleeping face in the dark room. As such, the user can see a night-vision image that is not usually available.

Figure 13C:
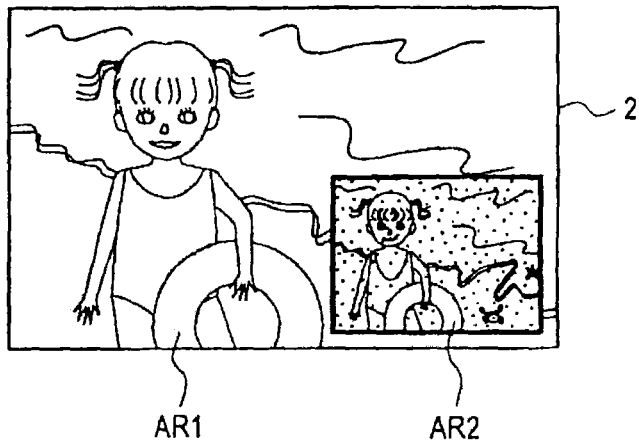

FIG. 13C shows exemplary image display in which the area AR1 displays therein an image normally captured by the imaging function component C1. With such image display, when the system controller 10 issues a command for the imaging control section 11 (the imaging section 3, and the imaging signal processing section 15) of the imaging function component C2 to increase the ultraviolet sensitivity, the area AR2 accordingly displays therein the image in which the ultraviolet sensitivity is thus increased. As such, the user can see an image with the ultraviolet component that is not usually available to see.

Figure 14A:
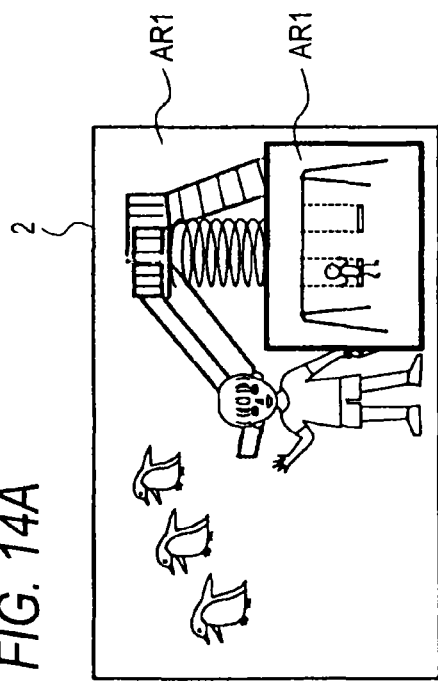
FIGS. 14A to 14C are each a diagram showing still another image display state of the embodiment.
Figure 14C:
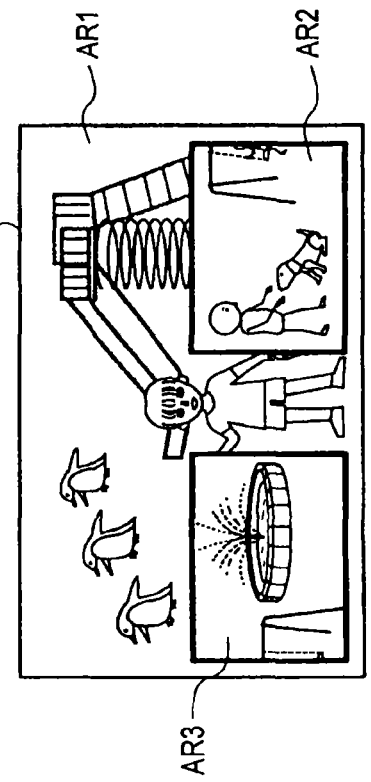
Figure 14B:
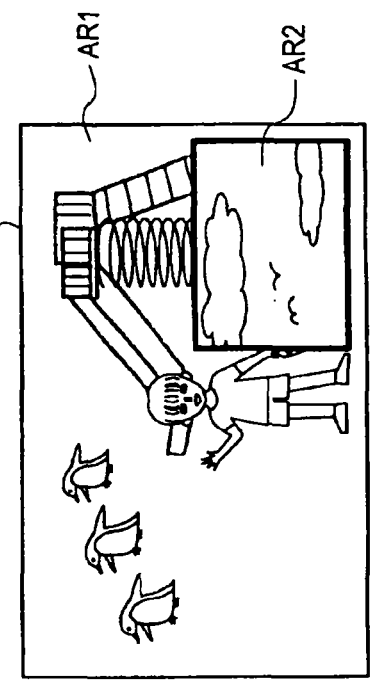

By referring to FIGS. 12A to 13C, described above are the exemplary cases where the imaging function components C1 and C2 are both so disposed as to cover the area in front of a user for imaging in the configuration of FIG. 4. FIG. 14A to 14C each show exemplary image display in which, in the configuration of FIG. 4, the imaging function component C1 is so disposed as to cover the area for imaging in front of a user, i.e., the field of view direction of a user, and the imaging function component C2 is so disposed as to cover the area for imaging in the direction different from the field of view direction of the user.

Figure 15A:
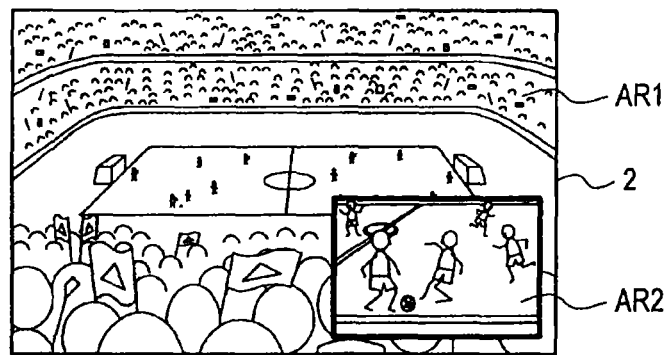
FIGS. 15A to 15C are each a diagram showing still another image display state of the embodiment.

When the imaging function component C2 is so disposed as to cover the area in the rear of a user for imaging, for example, the image display state will be as shown in FIG. 15A. The area AR1 displays therein an image captured by the imaging function component C1 for the view in front of the user, and the area AR2 displays therein an image captured by the imaging function component C2 for the view in the rear of the user.

Figure 15B:
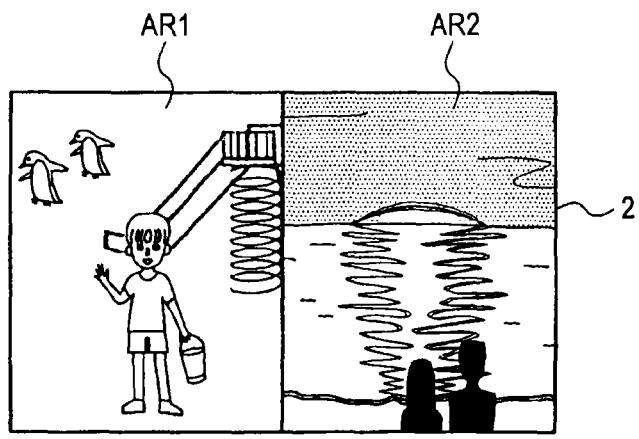

When the imaging function component C2 is so disposed as to cover the area for imaging above the user, for example, the image display state will be as shown in FIG. 15B. The area AR1 displays therein the image captured for the view in front of the user, and the area AR2 displays therein the image captured for the view above the user.

Also in these cases, while looking at the area AR1 displaying the normal image captured for the view in the field of view direction, the user can look at the area AR2 displaying the image of the view in the direction different from the user's field of view, e.g., rear image and upper image.

FIG. 14C shows an exemplary display in the configuration that three of the imaging function component are provided. Although the configuration is not shown, the three imaging function components are denoted by C1, C2, and C3 for convenience.

Presumably, for imaging, the imaging function component C1 covers the area in front of a user, the imaging function component C2 covers the area in the rear right of the user, and the imaging function component C3 covers the area in the rear left of the user.

In these cases, the area AR1 displays therein an image captured by the imaging function component C1 for the area in front of a user, and the areas AR2 and AR3 respectively display therein images captured by the imaging function components C2 and C3 for the areas in the rear right and rear left directions.

As such, the user can perceive the areas in the rear right and rear left in addition to the normal view in front the area displayed in the area AR1 so that he or she can see the area, almost, around him or her.

FIGS. 15A to 16C each show an exemplary display with the configuration including the communications section 26 for use as an image source as shown in FIG. 5.

Figure 15C:
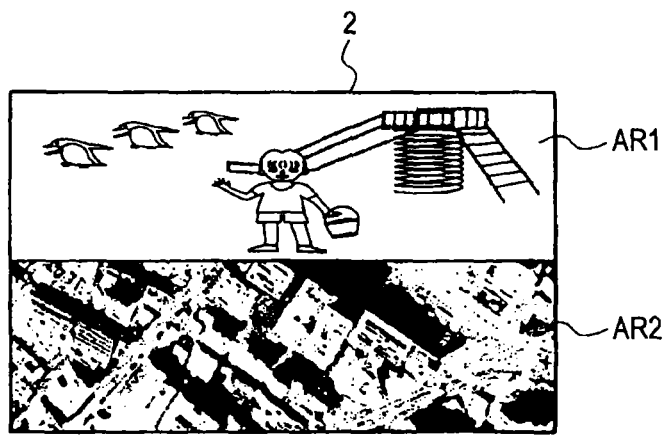

FIG. 15A to 15C each show an exemplary display of an image provided by the external imaging apparatus 70 with such communications as shown in FIG. 6A or 6C, and received by the communications section 26.

In FIG. 15A, the area AR1 is displaying an image captured by the imaging function component C1 for the user's field of view. That is, the user is watching the soccer game in the stadium from the seating area. At this time, the system controller 10 makes the area AR2 of the display section 2 display therein the image captured by the imaging apparatus 70 and received by the communications section 26. Herein, the imaging apparatus 70 performs imaging at some other place in the stadium.

The imaging apparatus 70 may be disposed in the vicinity of the seat for a coach, or the imaging apparatus 70 reduced in size may be worn by a judge. Videos from such an imaging apparatus 70 are received and displayed in the area AR2 of the display section 2 so that a user can watch the game with more interests.

FIG. 15B shows a case where videos captured by the imaging apparatus 70 disposed in any resort area or carried around by a user's friend in travel are received by the communications section 26. The system controller 10 makes the area AR1 display therein an image captured by the imaging function component C1 for the view in front of the user, and at the same time, makes the area AR2 display therein an image of the videos received by the communications section 26.

With such image display, the user can see images of various areas while being in a park or others in the neighborhood.

FIG. 15C shows an example in which an image on Earth (bird view image) captured by the imaging apparatus 70 disposed in an airplane or satellite is received by the communications section 26, and is displayed on the display section 2. That is, the system controller 10 makes the area AR1 display therein an image captured by the imaging function component C1 for the view in front of a user, and at the same time, makes the area AR2 display therein the image received by the communications section 26.

With such image display, the user can enjoy the view that is not usually available.

Figure 16A:
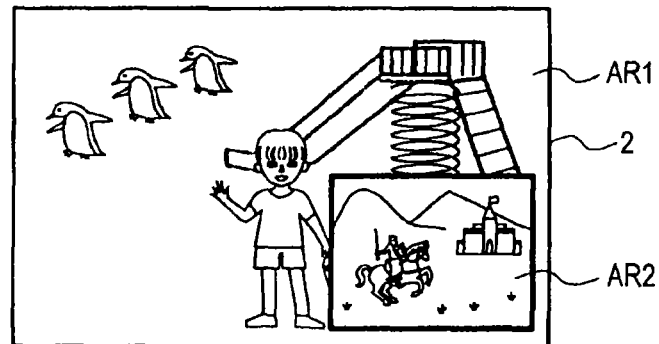
FIGS. 16A to 16C are each a diagram showing still another image display state of the embodiment.
Figure 16B:
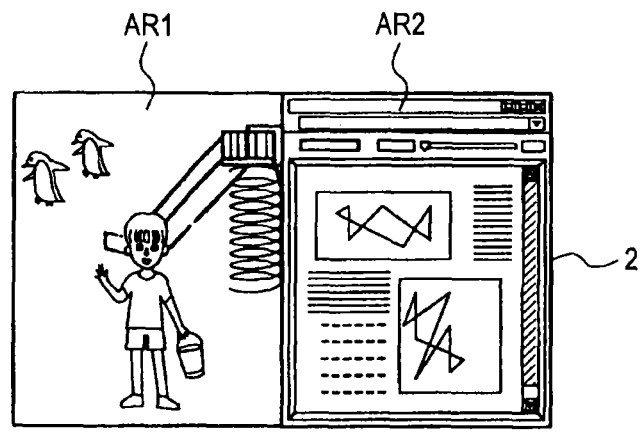
Figure 16C:
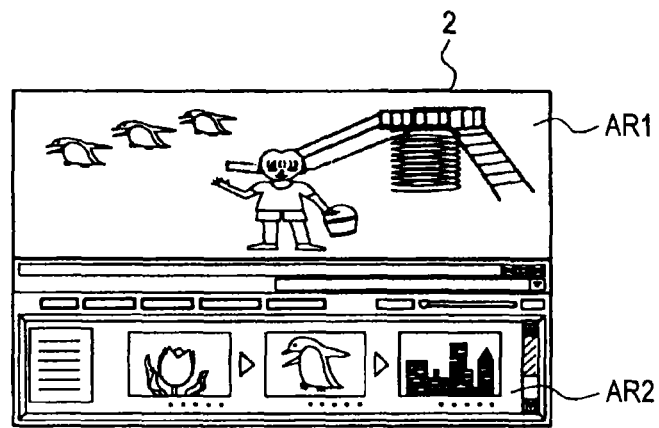

FIG. 16A to 16C each show an exemplary display of an image provided by the external content source device 71 with such communications as shown in FIG. 6B or 6C, and received by the communications section 26.

FIG. 16A shows an example in which, when an image content, i.e., moving image content or still image content, provided by the content source device 71 such as AV equipment and personal computer is received, the display section 2 displays thereon the image content. The system controller 10 makes the area AR1 display therein an image captured by the imaging function component C1 for the view in front of a user, and at the same time, makes the area AR2 display therein an image of the content received by the communications section 26.

FIG. 16B shows an example in which image data is forwarded to the imaging display apparatus 1, and in the imaging display apparatus 1, image data received by the communications section 26 is displayed on the display section 2. The image data to be forwarded to the imaging display apparatus 1 is the browser screen of a website being accessed in the content source device 71 such as personal computer, or the application screen being started up. For example, the system controller 10 asks the external content source device 71 for data communications via the communications section 26, and makes the communications section 26 receive the data provided in response to the request. The system controller 10 makes the area AR1 display therein an image captured by the imaging function component C1 for the view in front of a user, and at the same time, makes the area AR2 display therein an image such as the browser screen or others received by the communications section 26.

FIG. 16C shows an example in which the imaging display apparatus 1 transmits thumbnail images of photo images available in the content source device 71 such as personal computer. The thumbnail images are received by the communications section 26 in the imaging display apparatus 1, and are displayed on the display section 2. For example, the system controller 10 asks the external content source device 71 for data communications via the communications section 26, and makes the communications section 26 receive the data provided in response to the request. The system controller 10 makes the area AR1 display therein an image captured by the imaging function component C1 for the view in front of a user, and at the same time, makes the area AR2 display therein an image of the data received by the communications section 26.

As with such examples of FIGS. 16A, 16B, and 16C, for use as an image provided by the content source device 71, data coming from AV equipment such as video player or an information processor such as personal computer is received for image display so that a user can check images of the data or go through various operations in the imaging display apparatus 1 he or she is wearing.

Figure 17A:
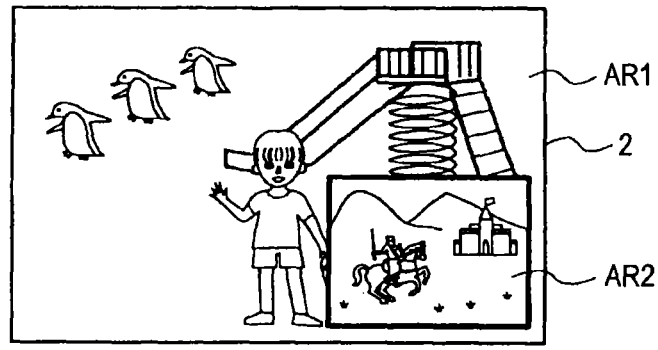
FIGS. 17A to 17C are each a diagram showing still another image display state of the embodiment.
Figure 17B:
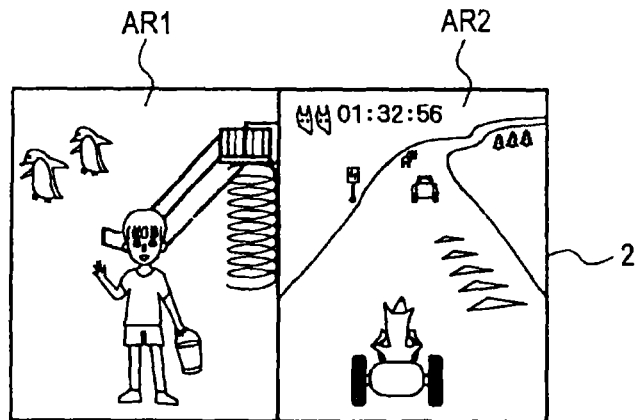
Figure 17C:
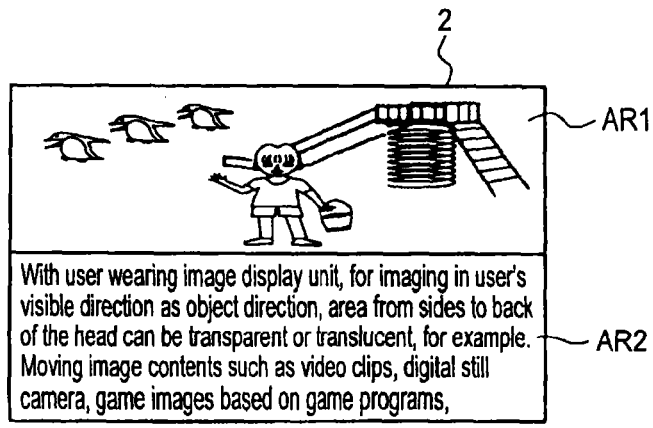

FIGS. 17A to 17C each show an exemplary display in the configuration of including the storage section 25 as an image source as shown in FIG. 7.

FIG. 17A shows an example in which a recording medium in the storage section 25 is recorded with image contents, i.e., moving image contents and still image contents, and the image contents are reproduced for display on the display section 2. The system controller 10 issues a command for the storage section 25 to perform reproduction. The system controller 10 then makes the area AR1 display therein an image captured by the imaging function component C1 for the view in front of a user, and at the same time, makes the area AR2 display therein the content image being the reproduction result of the storage section 25.

FIG. 17B shows an example in which a recording medium in the storage section 25 is recorded with a game program, and images based on the game program are displayed on the display section 2. The system controller 10 issues a command for the storage section 25 to execute the game program. The system controller 10 then makes the area AR1 display therein an image captured by the imaging function component C1 for the view in front of a user, and at the same time, makes the area AR2 display therein an image of the game program executed by the storage section 25.

FIG. 17C shows an example in which a recording medium in the storage section 25 is recorded with an E-book content, and the E-book content is reproduced for display on the display section 2. The system controller 10 issues a command for the storage section 25 to reproduce data of the E-book content. The system controller 10 then makes the area AR1 display therein an image captured by the imaging function component C1 for the view in front of a user, and at the same time, makes the area AR2 display therein the image of the e-book content reproduced by the storage section 25.

As with such examples of FIGS. 17A, 17B, and 17C, using the imaging display apparatus 1, the user can enjoy a reproduced image of data recorded on the recording medium while looking at an image in the normal field of view direction.

Note here that exemplified in FIGS. 17A to 17C are the images provided by the storage section 25 as an image source, and exemplified in FIGS. 16A to 16C are the images provided by the external content source device 71 and received by the communications section 26. Alternatively, the images exemplified in FIGS. 16A to 16C may be regarded as reproduced images provided by the storage section 25, or the images exemplified in FIGS. 17A to 17C may be regarded as those provided by the external content source device 71 and received by the communications section 26.

The exemplary various displays described above are no more than examples. In this embodiment, the imaging function component C1 being a first image source captures an image of the view in the field of view direction of a user, and the resulting image is used as a display image signal. Any other image sources each generate a display image signal being an image different from the image captured by the imaging function component C1. These images being the display image signals provided by the image sources are displayed on the display section 2 all at once. The display with such an operation varies to a great extent.

In the below, variously exemplified is a display image signal being an image for display in the area AR2 of the display section 2 when a display image signal to be displayed in the area AR1 thereof is an image signal of an image normally captured by the imaging function component C1 for the area in the field of view direction of a user.

Considered first is a case where, in the configuration of FIG. 4, the imaging function component C2 is so disposed as to cover the area for imaging in front of a user similarly to the imaging function component C1. For such a case, exemplified below are possible display image signals based on an imaging signal derived by the imaging section 3 of the imaging function component C2:

Display image signal being a telephoto zoom image as a result of the zoom operation in the imaging section 3 of the imaging function component C2.

Display image signal being a wide-angle zoom image as a result of the zoom operation in the imaging section 3 of the imaging function component C2.

Display image signal being a long-range image as a result of the focus control operation in the imaging section 3 of the imaging function component C2.

Display image signal being a close-range image as a result of the focus control operation in the imaging section 3 of the imaging function component C2.

Display image signal being a high-speed-captured image or a low-speed-captured image as a result of imaging frame rate change in the imaging section 3 of the imaging function component C2.

Display image signal through with a scale-up process as signal processing in the imaging signal processing section 15 of the imaging function component C2.

Display image signal through with a scale-down process as signal processing in the imaging signal processing section 15 of the imaging function component C2.

Display image signal as a result of brightness increase with an increase of imaging sensitivity in the imaging section 3 of the imaging function component C2.

Display image signal as a result of brightness decrease with a decrease of imaging sensitivity in the imaging section 3 of the imaging function component C2.

Display image signal being a night-view image as a result of increase of infrared imaging sensitivity in the imaging section 3 of the imaging function component C2.

Display image signal being an image as a result of increase of ultraviolet imaging sensitivity in the imaging section 3 of the imaging function component C2.

Display image signal being an image captured in the imaging section 3 by cutting a specific wavelength band in the imaging function component C2.

Display image signal being a brightness-increased image as a result of increase of intensity by signal processing in the imaging signal processing section 15 of the imaging function component C2.

Display image signal being a brightness-decreased image as a result of decrease of intensity by signal processing in the imaging signal processing section 15 of the imaging function component C2.

Display image signal being an image through with color or tone change by color signal processing in the imaging signal processing section 15 of the imaging function component C2.

Display image signal being an image through with adjustment of contrast, sharpness, or others by signal processing in the imaging signal processing section 15 of the imaging function component C2.

Display image signal being an image as a result of image effects processing as signal processing in the imaging signal processing section 15 of the imaging function component C2, e.g., mosaicing, intensity inversion, soft focus, partial highlight display, and entire highlight display, for example.

Display image signal derived by the imaging function component C2 by combinations of the operations and signal processing described above.

When the imaging function component C2 captures an image of the view in front of a user similarly to the imaging function component C1, deriving a display image signal by such operations and processing enables to display, all at once, the image of the display image signal of the imaging function component C1 and the image different therefrom.

The display image signals are surely not restrictive to those exemplified above, and vary in type as "an image different from the image of the imaging function component C1" as a result of the operation of the imaging section 3 of the imaging function component C2 and the signal processing by the imaging signal processing section 15.

Alternatively, various requirements may be arbitrarily changed, e.g., scaling factor for zoom processing and scale-up/scale-down processing, level for an imaging sensitivity change, and processing coefficient for processing of intensity signal and color signal.

On the other hand, in the configuration of FIG. 4, when the imaging function component C2 is so disposed as to capture an image of the view not in the field of view direction for the imaging function component C1, i.e., in front of a user, a display image signal derived by the imaging function component C2 will be exemplified as below.

That is, in such a case, an image captured normally by the imaging function component C2 already shows the view different from that of the image captured normally by the imaging function component C1, e.g., image showing the view in the rear, upward, downward, rightward, and leftward. As such, the captured image signal of the imaging function component C2 may be used as a display image signal as it is, and the display image signal may be displayed on the display section 2 together with the display image signal of the imaging function component C1.

In such a case, as exemplarily listed above, image signals as a result of the imaging operations by the imaging section 3 of the imaging function component C2 or the signal processing by the imaging signal processing section 15 may be used as display image signals.

The above description is similarly applicable to a case where three or more of the imaging function component are provided, i.e., C1, C2, C3, and others. Considered now is a case where any of the imaging function components C2, C3, and others is provided with an imaging function component for capturing an image of the view in the same direction as the imaging function component C1. In this case, the resulting captured image signals may be subjected to the imaging operations by the imaging section 3 or the signal processing by the imaging signal processing section 15, and the resulting images of the view different from that of the imaging function component C1 may be used as display image signals.

In another case where any of the imaging function components C2, C3, and others is provided with the imaging section 3 for capturing an image of the view in the direction different from that of the imaging function component C1, i.e., direction not in front of a user. In this case, the resulting captured image signals may be used as display image signals, or as exemplarily listed above, image signals through with the imaging operations by the imaging section 3 or the signal processing by the imaging signal processing section 15 may be used as display image signals.

In still another case where any of the imaging function components C2, C3, and others is provided with an imaging function component for capturing an image of the view in the same direction. In this case, one of the normally-captured resulting images is used as a display image signal, and the remaining image signal through with the operations by the imaging section 3 or signal processing by the imaging signal processing section 15 is used as a display image signal. This enables to derive display image signals of different images from the images captured for the view in the same direction. In this case, surely, as described above, both of the images signals through with operations by the imaging section 3 or the signal processing by the imaging signal processing section 15 may be used as display image signals.

When the imaging function components C2 and C3 both capture an image of the view in the rear of a user, one of the resulting normally-captured images may be used as a display image signal, and the other being a telephoto image may be used as a display image signal. On the other hand, one of the images being a scaled-up image may be used as a display image signal, and the other being an ultraviolet-sensitivity-increased image may be used as a display image signal.

This is also applicable to the configuration in which the imaging function component C2 is a movable imaging section that can be changed in direction for imaging. With such an image function component C2, any images captured for the view not in front of a user or any image signals through with the operations of the imaging section 3 and the signal processing by the imaging function processing section 15 may be used as display image signals.

A movable imaging section provided as such may enable movable control of variously changing the imaging direction. When any captured image signal is subjected to image analysis and a specific target is detected, for example, the imaging direction may be changed in accordance with the movement of the specific target in the captured image. Through such control, a user can see an image following the specific target in the area AR2, for example.

This is applicable also to a case of displaying images provided by an external device and received by the communications section 26.

That is, images from the external imaging apparatus 70 and the content source device 71 are different from images of display image signals derived by the imaging function component C1. Therefore, by displaying the image signals received by the communications section 26 as display image signals as they are on the display section 2, various types of images can be available for display to a user.

This is also applicable to images reproduced by the storage section 25, which are different from images of the display image signals derived by the imaging function component C1. As such, by displaying the image signals being the reproduction results of the storage section 25 as display image signals as they are on the display section 2, various types of images can be available for display to a user.

Note here that when the display image processing section 12 is allowed to execute image signal processing, e.g., image scaling-up or -down, processing of intensity or color, adjustment of contrast or sharpness, and image effects processing, the image signals received by the communications section 26 or the image signals being the reproduction results of the storage section 25 may be subjected to such image signal processing, thereby generating display image signals.

When the communications section 26 and the storage section 25 are each being an image source, image display similar to that made by a personal computer or others is also possible, e.g., variable-speed reproduction including high-speed reproduction, slow-speed reproduction, and frame-by-frame advance, display page change, and scrolling display.

Described above is the case where the images normally captured by the imaging function component C1 are display image signals. Alternatively, image signals through with operations by the imaging section 3 and signal processing by the imaging signal processing section 15 in the imaging function component C1 may be used as display image signals. The operations and signal processing include, for example, telephoto/wide-angle zoom, scale-up/scale-down, sensitivity change, close-range imaging/long-range imaging, processing of intensity or color, and image effects processing.

In any cases, any other image sources may be so configured as to generate display image signals of images different from those from the imaging function component C1.

5. Exemplary Operation Trigger

As shown in the flowchart of FIG. 11, the system controller 10 performs display of images provided by a plurality of image sources when determining in step F101 that a display start trigger is generated for a plurality of images. The system controller 10 also makes a display detail change or a display configuration change when determining in step F103 that a display change trigger is generated. Moreover, the system controller 10 ends the display operation of a plurality of images when determining in step F104 that a display end trigger is generated for a plurality of images.

The triggers related to display operations as such may be generated in response to a user's operation. Alternatively, as described above, the state of a user or the state of the outside world may be detected first, and then based on any predetermined requirements, the system controller 10 may determine that a trigger is generated.

In the below, described is an example in which a determination is made about generation of a trigger based on the state of a user or the state of the outside world.

When the state of a user is referred to for determining generation of a trigger, the imaging display apparatus 1 is provided for the purpose with, as the operation trigger information generation section 16, a vision sensor, an acceleration sensor, a gyro sensor, a body sensor, and others.

The vision sensor is assumed as detecting information about the user's sense of sight, and can be implemented by an imaging section if it is disposed in the vicinity of the display section 2 for capturing an image of the portion of the user's eyes, for example. The resulting image captured as such by the imaging section for the portion of the user's eyes is acquired by the system controller 10 for image analysis thereof, thereby detecting various types of information, e.g., direction of line of sight, focal length, pupillary reflex, eyeground pattern, blinking of eyelid, and others. These detection results are used as a basis to determine the state of a user and his or her intension.

Alternatively, the vision sensor may be configured by a light-emitting section and a light reception section. The light-emitting section is disposed in the vicinity of the display section 2 for illuminating the portion of the user's eyes, and the light reception section receives the light reflected by the portion of the eyes. For example, light-receiving signals may be used to detect the thickness of the crystalline lens of the user so that the focal length can be detected for the user's eyes.

By detecting the direction of line of sight of a user, the system controller 10 can determine which part of the image displayed on the display section 2 the user is watching with interests.

The system controller 10 can acknowledge the direction of line of sight of a user as an operation input. For example, the lateral movement of the user's line of sight may be regarded as a predetermined operation input for the imaging display apparatus 1.

Detecting the focal length of a user also enables to determine whether the view the user is watching with interests is of a close range or a long-range. Based on the detection result, control may be accordingly applied, e.g., zoom, scale-up or -down, and focal point change. For example, when a user looks at the view in the long range, telephoto display is accordingly made.

Detecting the pupillary reflex of a user enables to determine the brightness around the user if the detection result tells that the state is through, and when the detection result tells that the state is of a monitor display, determine the glaring of the currently-displayed image perceived by the user. Based on results of such determinations, adjustments of intensity and imaging sensitivity can be accordingly performed.

Detecting the eyeground pattern of a user helps authentication of the user, for example. Because the eyeground pattern is unique to each individual, the eyeground pattern can be used to identify who is wearing the apparatus before control application specifically for the user, or only any specific user can be allowed to execute the display operation, for example.

Detecting the blinking of a user's eyelids enables to determine the level of glaring perceived by the user or the fatigue of the user's eyes. Blinking of eyelids can be acknowledged also as any intentional operation input made by a user, e.g., when a user blinks three times, it will be determined as a predetermined operation input.

The acceleration sensor and the gyro sensor each output a signal in accordance with the user's movement. For example, the acceleration sensor is suitable for detecting the movement in the linear direction, and the gyro sensor is suitable for detecting the rotation movement and oscillation.

When the acceleration sensor and the gyro sensor are disposed at any specific positions, these sensors are allowed to detect the movement of the user's body or parts of the body.

When these acceleration and gyro sensors are attached inside of the imaging display apparatus 1 of a glass type as shown in FIGS. 1A and 1B, i.e., the sensors are provided for detecting the movement of the user's head portion, the resulting detection information of the acceleration sensor will be about the movement of the user's head portion or the entire body, and the resulting be about the angular velocity and oscillation of the movement of the user's head portion or the entire body.

As such, the user's behavior of moving the portion above his or her neck can be detected, e.g., whether the user is looking up or down. When the user is looking down, it may be determined that he or she is looking the view in the close range such as a book at hand. On the other hand, when the user is looking up, it may be determined that he or she is looking the view in the long range.

When detecting any user's behavior of moving the portion above the neck, the system controller 10 may acknowledge that it is the user's intentional operation. For example, when he or she shakes his or her head twice, it will be regarded as a predetermined operation input.

Some type of acceleration sensor and the gyro sensor can determine whether the user remains still (not walking), walking, running, and others. It is also possible to detect the state change of the user, i.e., the user who has been standing is now sitting down, or the user who has been sitting down is now standing up.

If the acceleration sensor and the gyro sensor are provided separately from a wearable unit placed to the head portion, and are attached to the user's arm or leg, the sensor can detect the user's behavior only of the arm or the leg.

The body sensor detects the user's body information, e.g., information about heartbeat (heartbeat count), pulse (pulse count), perspiration, brain wave, e.g., a waves, $\beta$ waves, $\theta$ waves, and $\delta$ waves, or galvanic skin response, body heat, blood pressure, breathing activity, e.g., breathing rate, breathing depth, breathing capacity, and others. Using such information, the system controller 10 can determine the state of the user, e.g., whether the user is under pressure or excitation, is emotionally calm, or is comfortable or uncomfortable, for example.

Using such body information, it is also possible to detect whether the user is now wearing the imaging display apparatus 1. When the user is not wearing the imaging display apparatus 1, for example, the system controller 10 controllably puts the state into standby for detecting only body information. When the body information tells that the user puts on the imaging display apparatus 1, the system controller 10 controllably puts the state into power ON, and when the body information tells that the user takes off the imaging display apparatus 1, the system controller 10 controllably puts the state back to standby.

The detection information derived by the body sensor can be used for user's authentication, i.e., identification of who is wearing the apparatus.

Note here that the body sensor may be disposed inside of the wearable frame of the imaging display apparatus 1 of a glass type, for example. With such a disposition, the body sensor may be allowed to detect the information about the user's head portion on the sides or in the rear. Alternatively, the body sensor may be provided separately from the wearable frame of the imaging display apparatus 1, and attached to any predetermined portion of the body.

For detection of the state of the outside world, in the imaging display apparatus 1, for acquiring any outside world information, the operation trigger information generation section 16 is provided with a peripheral environment sensor, an imaging target sensor, a GPS (Global Positioning System) reception section, a date and time counting section, an image analysis section, or the communications section 26 may be used.

The peripheral environment sensor is exemplified by an illumination sensor, a temperature sensor, a humidity sensor, an atmospheric pressure sensor, and others.

Some type of the illumination sensor can detect information about the brightness of the area around the imaging display apparatus 1.

Some type of the temperature sensor, the humidity sensor, and the atmospheric pressure sensor can derive information for use as a basis to determine the temperature, humidity, the atmospheric pressure, or the weather.

With such peripheral environment sensors, the imaging display apparatus 1 is allowed to determine the brightness of the area therearound or the weather if the apparatus is disposed outside. As such, using such information as outside world information, the system controller 10 can controllably execute the operation of generating a display image signal suitable for the brightness therearound or the weather conditions, e.g., the intensity level is changed in the image based on the brightness therearound, or the tone of the image is changed based on the weather conditions.

The imaging target sensor detects information about an imaging target. The imaging target sensor is exemplified by a range sensor, a pyroelectric sensor, and others, and can derive information about the distance to the imaging target or information for finding out what is the imaging target.

By detecting the distance to the imaging target, the system controller 10 can controllably execute the imaging operation and display operation in accordance with the distance. Moreover, when an imaging target is detected as being a human being, for example, the system controller 10 can controllably execute the operation of generating a display image signal in accordance with the imaging target.

A GPS reception section 21 acquires information about latitude and longitude as the current position. When the latitude and longitude are detected, the GPS reception section 21 refers to a cartographic database or others, thereby acquiring information about the point at the current position, i.e., in the vicinity of the point. For reference use by the system controller 10, the GPS reception section 21 may be equipped with a relatively-large-capacity recording medium such as HDD (Hard Disk Drive) or a flash memory, and the recording medium may be recorded with the cartographic database so that the information related to the current position can be acquired.

In the configuration that the communications section 26 is provided, even if the imaging display apparatus 1 is not carrying therein a cartographic database, an access may be made to a network server or a device equipped therein with a cartographic database via the communications section 26. With such an access, information about latitude and longitude may be transmitted for asking for information in accordance with the current position so that the information on request may be received.

The information about the current position includes the area name in the neighborhood of the current position, the names of buildings, facilities, shops, stations, and others.

The information about the current position also includes the type of buildings, e.g., park, theme park, concert hall, theater, movie theater, sports facility, and others.

The information about the current position also includes the type or name of nature, e.g., seashore, sea, river, mountain-ringed region, mountain peak, forest, lake, plain, and others.

As information about a more detailed position, the information about the current position includes a specific area in a theme park, an audience area in a baseball field or a soccer field, a seating area in a concert hall, and others.

With such information acquired about the current position, the system controller 10 becomes able to controllably execute the operation of generating a display image signal in accordance with any geographic requirements, facilities, and others at the current position and in the neighborhood of the current position. The system controller 10 also becomes able to exercise control to start or end the display for the specific location.

The date and time counting section counts the date and time, i.e., year, month, and day, and hour, minute and second, for example. Such a date and time counting section enables the system controller 10 to acknowledge the current time, day or night, month, season, and others. As such, the system controller 10 can controllably execute the operation of generating a display image signal in accordance with day or night (time), the operation of generating a display image signal suitable for the current season, and others.

If with an image analysis section for use to analyze a captured image, the following various types of information can be detected from a captured image for an imaging target.

The imaging target can be defined by type in the captured image, e.g., human being, animal, nature, building, and device. When the imaging target is defined as being an animal, the image may include a bird as being an object, or a cat as being an object, for example. When the imaging target is defined as being a nature, the image may include sea, mountain, trees, river, lake, sky, the Sun, the Moon, and others. When the imaging target is defined as being a building, the image may include a house, a building, a sports arena, and others. When the imaging target is a device, the image may include a personal computer, AV (Audio-Visual) equipment, mobile phone, PDA, IC (Integrated Circuit) card, two-dimensional bar code, and others.

For type definition of an imaging as such, a characteristic setting may be made in advance for each of varying shapes, and a determination may be made whether a captured image includes therein an object of any of the shapes.

If with image analysis performed by an image analysis section, the movement of an object, e.g., any quick movement, can be detected in the image with a technique of difference detection or others made between frames in the image. If this is the case, it becomes possible to detect any state of capturing an image of any object quickly in motion, e.g., capturing an image of a player(s) during a game, capturing an image of a vehicle(s) on the run.

Also if with image analysis performed by the image analysis section, it is possible to detect the peripheral environment around a user, e.g., the brightness can be determined based on the time of day or the weather, and the amount of rainfall.

Also if with image analysis performed by the image analysis section, when a human being is an imaging object, it is possible to identify the person from his or her face. As already known, the face of a human being can be constructed as individual characteristic data for use as relative position information about parts of the face. For example, each individual has his or her own unique ratio of Ed/EN, i.e., a space EN from the center of eyes to a nose to a space Ed between the eyes, and ratio of Ed/EM, i.e., a space EM from the center of eyes to a mouth to the space Ed between eyes. As such, the ratios are known as being information not susceptible to changes of a user's outer appearance, e.g., even if a user changes his or her hair style or put on or take off a pair of glasses. The ratios are also known as being information not susceptible to changes with aging.

As such, when a captured image includes a human face, the image analysis section can detect such individual characteristic data by analyzing the image.

When any individual characteristic data is detected from a captured image, information about a person being the object can be acquired if an HDD or a flash memory is equipped for reference use by the system controller 10, and if a human being database is stored in such a recording medium. Alternatively, even if no human being database is provided in the imaging display apparatus 1, an access may be made to a network server or a device equipped therein with a human being database via the communications section 26. With such an access, information about individual characteristic data may be transmitted for asking for information in need so that the information about a specific person may be received.

If any information about people a user has met before, e.g., name and title, is entered into the human being database together with the individual characteristic database, for example, when the user meets any specific person (captures his or her image), the system controller 10 can make a search of his or her information.

If there is a human being database carrying therein information about celebrities together with the individual characteristic data, when a user meets any of such celebrities, the system controller 10 can make a search of his or her information.

Based on detection information derived by the image analysis section as such, the system controller 10 can controllably execute the process of generating a display image signal specifically for the imaging target. When the image of any specific target or person is captured, a display image signal of highlighting the target may be generated, for example.

With the communications section 26, as outside world information, various types of information can be acquired.

For example, as described in the foregoing, the communications section 26 can acquire information found by any external device in accordance with information about latitude and longitude or individual characteristic data provided by the imaging display apparatus 1.

Moreover, from any external device, the communications section 26 can acquire information about weather, e.g., weather information, temperature information, and humidity information.

Moreover, from any external device, the communications section 26 can acquire information about facilities, e.g., information about how to use the facilities, about whether imaging in the facilities is prohibited or permitted, guidance information, and others.

The communications section 26 can also acquire identification information about an external device itself, e.g., type and ID of the device for identification, as a network device, by any predetermined communications protocol.

The communications section 26 can also acquire image data stored in any external device, image data reproduced or displayed by the external device, image data received by the external device, and others.

Based on such information that can be acquired by the communications section 26, the system controller 10 can controllably execute the process of generating a display image signal.

Such components are provided as the operation trigger information generation section 16 for detecting the state of a user or the state of the outside world, and based on the detection results, the display is started, ended, or changed (display detail change and area configuration change), thereby implementing appropriate or interesting display operation with no specific user operation.

The configuration for detecting the state of a user and the state of the outside world varies more.

6. Effects of Embodiment, Modified Examples, and Enhanced Examples

As described in the foregoing, according to the embodiment, the screen area of the display section 2 partially displays, by a display image signal, an image captured by the imaging function component C1 for the view in the field of view direction of a user. At the same time, display is performed by a display image signal provided by any other image sources, e.g., the imaging function component C2, the communications section 26, and the storage section 25. In such a manner, while looking at the normal view in the field of direction, the user can see images different from the image normally perceived by the user's sense of sight. For example, while looking at an image captured by the imaging function component C1 for the view in front of the user, the user can see a telephoto image, a scaled-up image, a special-effect image, an image of the view in the rear, and others by the imaging function component C2. As such, the user can see the image of the view usually not available with the user's normal sense of sight together with any image of the normal view so that the user's visual ability can be enhanced artificially.

The external view and configuration of the imaging display apparatus 1 is not restrictive to the examples of FIGS. 1, 2, 3, 4, 5, 7, and 8, and various other modified examples are also possible.

An image signal derived by the imaging function component C1 or others may be recorded on a recording medium in the storage section 25.

An image signal derived as such by the imaging function component C1 may be forwarded from the communications section 26 to any other devices.

Alternatively, for imaging, the configuration may include a microphone for gathering audio in a close range, and an earphone-type speaker section for outputting audio, for example.

Still alternatively, the configuration may include a character recognition section for character recognition in an image, and an audio synthesis section for audio synthesis processing. When a captured image includes characters, an audio signal may be generated in the audio synthesis section by reading aloud the characters, and the resulting signal may be output from the speaker section.

The display image signal may be a still image. For example, in the imaging function components C1, C2, or others, still images may be captured at any predetermined trigger, and the resulting still images may be displayed on the display section 2.

Exemplified above is the imaging display apparatus 1 including a wearable unit of a glass-type or a head-wearing type. This is surely not restrictive, and the imaging display apparatus of the embodiment of the invention may be so configured as to include, as the imaging function component C1, first image signal generation means for generating a display image signal based on a captured image signal derived by the imaging section taking charge of imaging in the field of view direction of a user. That is, the configuration will do if at least an image in the field of view direction of a user is captured. As such, a unit equipped with the first image signal generation means (the image function component C1) for a user to wear is not restrictive in type, e.g., a headphone type, a neck band type, and an ear-hang type. Moreover, for a user to wear, the unit may be attached to a normal pair of glasses, visor, headphone, or others using an attachment member such as clip. Moreover, the unit is not necessarily placed to the head portion of a user.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging display apparatus, comprising:
a display unit for image display;
a first image signal generation section that generates a display image signal based on a captured image signal captured by an imaging section with a field of view direction of a user being a direction of an object;
a second image signal generation section that generates a display image signal of an image different from an image of the display image signal generated by the first image signal generation unit; and
circuitry configured to
generate a trigger in response to the state of the user or the state of the outside world; and
control, simultaneously on the display unit, display of the image of the display image signal generated by the first image signal generation section and display of the image of the display image signal generated by the second image signal generation section based on the generated trigger.

2. The imaging display apparatus according to claim 1, wherein
the display unit is disposed before eyes of a user for the image display.

3. The imaging display apparatus according to claim 1, wherein
the display unit is formed in a chassis different from a chassis including therein the first image signal generation section.

4. The imaging display apparatus according to claim 1, wherein
the first image signal generation section includes:
the imaging section; and
a signal processing section that performs signal processing with respect to the captured image signal captured by the imaging section.

5. The imaging display apparatus according to claim 1, wherein
the second image signal generation section generates the display image signal to be supplied to the display unit based on the captured image signal captured by the imaging section.

6. The imaging display apparatus according to claim 5, wherein
the second image signal generation section includes:
the imaging section; and
a signal processing section that performs signal processing with respect to the captured image signal captured by the imaging section.

7. The imaging display apparatus according to claim 5, wherein
the second image signal generation section generates the display image signal of the image different from the image of the display image signal generated by the first image signal generation section by operation control exercised by the imaging section over an imaging lens system.

8. The imaging display apparatus according to claim 6, wherein
the second image signal generation section generates the display image signal of the image different from the image of the display image signal generated by the first image signal generation section by the signal processing in the signal processing section.

9. The imaging display apparatus according to claim 1, wherein
the second image signal generation section includes a reception section that receives an image signal from an external device, and generates, based on the image signal received by the reception section, the display image signal of the image different from the image of the display image signal generated by the first image signal generation section.

10. The imaging display apparatus according to claim 1, wherein
the second image signal generation section includes a reproduction section that reproduces an image signal from a recording medium, and generates, based on the image signal reproduced by the reproduction section, the display image signal of the image different from the image of the display image signal generated by the first image signal generation section.

11. The imaging display apparatus according to claim 1, wherein
the display unit is set with, in a screen area, a master screen area and a slave screen area, and in either the master screen area or the slave screen area, image display is made by the display image signal provided by the first image signal generation section, and on the remaining screen area, image display is made by the display image signal provided by the second image signal generation section.

12. The imaging display apparatus according to claim 1, wherein
in the display unit, a screen area is split into two areas, and in one of the two areas, image display is made by the display image signal provided by the first image signal generation section, and in the remaining area, image display is made by the display image signal provided by the second image signal generation section.

13. The imaging display apparatus according to claim 1, wherein
one of the display image signals generated by the first and second image signal generation section is an image signal captured by close-range imaging or long-range imaging.

14. The imaging display apparatus according to claim 1, wherein
one of the display image signals generated by the first and second image signal generation section is an image signal captured by telephoto imaging or wide-angle imaging.

15. The imaging display apparatus according to claim 1, wherein
one of the display image signals generated by the first and second image signal generation section is an image signal captured by scale-up processing or scale-down processing.

16. The imaging display apparatus according to claim 1, wherein
one of the display image signals generated by the first and second image signal generation section is an image signal captured with an increase or a decrease of an imaging sensitivity.

17. The imaging display apparatus according to claim 1, wherein
one of the display image signals generated by the first and second image signal generation section is an image signal captured with an increase of an infrared imaging sensitivity.

18. The imaging display apparatus according to claim 1, wherein
one of the display image signals generated by the first and second image signal generation section is an image signal captured with an increase of an ultraviolet imaging sensitivity.

19. The imaging display apparatus according to claim 1, wherein
one of the display image signals generated by the first and second image signal generation section is an image signal captured in a field of view direction of a user being a direction of an object.

20. The imaging display apparatus according to claim 1, wherein
one of the display image signals generated by the first and second image signal generation section is an image signal captured in a direction, as the direction of the object, different from the field of view direction of the user.

* * * * *